United States Patent
Albaghajati et al.

(10) Patent No.: US 11,120,303 B2
(45) Date of Patent: Sep. 14, 2021

(54) ENHANCED DEEP REINFORCEMENT LEARNING DEEP Q-NETWORK MODELS

(71) Applicant: KING FAHD UNIVERSITY OF PETROLEUM AND MINERALS, Dhahran (SA)

(72) Inventors: Anas Mohammed Albaghajati, Dhahran (SA); Lahouari Ghouti, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 36 days.

(21) Appl. No.: 16/662,876

(22) Filed: Oct. 24, 2019

(65) Prior Publication Data

US 2020/0193226 A1    Jun. 18, 2020

Related U.S. Application Data

(60) Provisional application No. 62/780,546, filed on Dec. 17, 2018.

(51) Int. Cl.
*G06K 9/62* (2006.01)
*G06N 3/04* (2006.01)
(Continued)

(52) U.S. Cl.
CPC ........ *G06K 9/6256* (2013.01); *G06K 9/00711* (2013.01); *G06K 9/54* (2013.01);
(Continued)

(58) Field of Classification Search
CPC ........ G06N 3/08; G06N 3/0454; G06N 3/084; G06N 3/02; G06T 2207/20084;
(Continued)

(56) References Cited

U.S. PATENT DOCUMENTS

2003/0222977 A1*  12/2003  Yoshino ............... H04N 13/393
                                            348/51
2015/0100530 A1*   4/2015  Mnih ..................... G06N 20/00
                                            706/25
(Continued)

FOREIGN PATENT DOCUMENTS

WO    WO 2018/183546 A1    10/2018

OTHER PUBLICATIONS

Jun Chen, et al., "Double-task Deep Q-learning with Multiple views", CVF, ICCV Workshop Paper, Computer Vision Foundation, Oct. 29, 2017, pp. 1050-1058.
(Continued)

*Primary Examiner* — Jingge Wu
(74) *Attorney, Agent, or Firm* — Oblon, McClelland, Maier & Neustadt, L.L.P.

(57) ABSTRACT

A reinforcement learning method and apparatus includes storing video frames in a video memory, performing a first preprocessing step of retrieving a sequence of n image frames of the stored video frames, and merging the n image frames in a fading-in fashion by incrementally increasing the intensity of each frame up to the most recent frame having full intensity to obtain a merged frame; and performing a training step of inputting the merged frame to the DQN and training the DQN to learn Q-values for all possible actions from a state represented by the merged frame with only a single forward pass through the network. The learning method and apparatus includes a second preprocessing step of removing the background from the merged frame. The method can be applied to any DQN learning method that uses a convolution neural network as its core value function approximator.

20 Claims, 23 Drawing Sheets

(51) Int. Cl.
  *G06N 3/08* (2006.01)
  *G06T 7/194* (2017.01)
  *G06T 5/00* (2006.01)
  *G06T 5/50* (2006.01)
  *G06K 9/00* (2006.01)
  *G06K 9/54* (2006.01)
  *A63F 13/812* (2014.01)
  *A63F 13/25* (2014.01)

(52) U.S. Cl.
  CPC ............... *G06N 3/04* (2013.01); *G06N 3/08* (2013.01); *G06T 5/007* (2013.01); *G06T 5/50* (2013.01); *G06T 7/194* (2017.01); *A63F 13/25* (2014.09); *A63F 13/812* (2014.09); *G06T 2207/10016* (2013.01); *G06T 2207/20081* (2013.01); *G06T 2207/20084* (2013.01); *G06T 2207/20221* (2013.01)

(58) Field of Classification Search
  CPC . G06T 2207/20081; G06T 2207/10016; G06T 7/0012; G06T 2207/10088; G06T 5/50; G06T 5/007; G06T 7/194; G06T 5/004; G06K 9/00617; G06K 9/6256; G06K 9/6267; G06K 9/6262
  See application file for complete search history.

(56) References Cited

U.S. PATENT DOCUMENTS

| | | | |
|---|---|---|---|
| 2017/0103532 A1* | 4/2017 | Ghesu | G16H 50/20 |
| 2017/0116497 A1* | 4/2017 | Georgescu | G16H 50/70 |
| 2017/0217102 A1* | 8/2017 | Mansi | G05B 19/4099 |
| 2018/0174038 A1 | 6/2018 | Jiang et al. | |
| 2019/0286990 A1* | 9/2019 | Kenney | G06N 3/0454 |
| 2020/0026965 A1* | 1/2020 | Guo | G06N 3/0454 |
| 2020/0061811 A1* | 2/2020 | Iqbal | B25J 9/161 |
| 2020/0104645 A1* | 4/2020 | Ionescu | G06N 3/084 |
| 2020/0226411 A1* | 7/2020 | Gupta | G06F 16/532 |
| 2020/0226463 A1* | 7/2020 | Chen | G06N 3/0454 |
| 2021/0001857 A1* | 1/2021 | Nishitani | H04W 4/40 |

OTHER PUBLICATIONS

Hakan Bilen, et al., "Action Recognition with Dynamic Image Networks", Transactions on Pattern Analysis and Machine Intelligence, Aug. 19, 2017, pp. 1-14.
Talmo D. Pereira, et al., "Fast animal pose estimation using deep neural networks", BIORXIV Preprint, http://dx.doi.org/10.1101/331181, Nature Methods, Dec. 20, 2018, 47 pages.

* cited by examiner

ENHANCED DEEP REINFORCEMENT LEARNING DEEP Q-NETWORK MODELS

CROSS-REFERENCE TO RELATED APPLICATIONS

This application claims the benefit of priority to provisional application No. 62/780,546 filed Dec. 17, 2018, the entire contents of which are incorporated herein by reference.

BACKGROUND

Technical Field

The present disclosure is directed to deep reinforcement learning, and in particular, a simplified deep q-network that reduces dependency on powerful computing machines without compromising learning performance.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Artificial intelligence (AI), and in particular machine learning, has seen an increase in commercial application in recent years. Part of the reason for the increase in commercial application has been the success in applications such as natural language processing and other forms of pattern recognition such as face recognition. These successes have come about due to advances in hardware in combination with vast amounts of data available by way of the Internet. Machine learning algorithms in the form of neural networks require processing of simple mathematical computations. Clock speed improvements in Central Processing Units (CPUs) have not increased as much as in the past. However, improvements in special purpose processors, in particular Graphics Processing Units (GPUs) has continued to climb. This difference between CPUs and GPUs is because CPUs are general purpose processors that are capable of performing a wide range of operations including control operations. GPUs specialize in specific mathematical operations, and principally being for graphics, perform these specific mathematical operations over a hundred or more processing cores. It turns out that GPUs are a good match for neural networks as they likewise require parallel processing of simple mathematical operations.

Many of the applications of machine learning use some form of supervised learning. In supervised learning, a machine learning model learns by being provided with an input and a corresponding known output (hence is supervised). For example, the known output may be a classification associated with the input. As a simple example, an input may be an image of an animal, and the output assigns the image to a type of animal, e.g., cat or dog. In some cases, the supervised learning just distinguishes between two classes, e.g., cat or not cat.

Thus, supervised training data includes known input-output pairs. The supervised learning process trains a machine learning model with the training data and subsequently, the machine learning model learns a function that represents a transform of the training inputs into outputs. Provided enough training data, the machine learning model may sufficiently learn a function such that it can recognize new inputs and provide appropriate outputs. As in the above simple example, the trained machine learning model would be able to determine whether an input image is for a cat or not, i.e., recognize an image of a cat. An intermediate step may include testing a trained machine learning model with known outputs to determine how well the trained machine learning model performs, i.e., generate an error rate.

A neural network architecture that is typically used for supervised learning includes layers of neuron processors in which each neuron processor in a layer is connected to all of the neuron processors in a previous layer. The input to the neural network is a vector. The last layer in the network is the output layer. In the case of images as the training inputs, each image in a training set may be, for example, 256 by 256 for each of red, green and blue (RGB) color. Since each neuron processor is connected to all other processors, the number of connections between one neuron processor and all neuron processors in a next layer is 196,608. As another example, a 1000 by 1000 pixel image with RGB color would have 3 million connections. It becomes evident that fully connected neural networks with multiple layers become much too complicated to feasibly process efficiently at scale. Since each layer may have multiple neuron processors, the total number of connections in a neural network easily reaches in the millions of connections. The number of connections is complex because each connection involves a mathematical computation with several parameters to be tuned during training. To improve processing speed, in each layer, the processing associated with the connections may be performed in parallel. However, it would take a very large number of processing operations just to perform 196,608 processes in parallel, and that number of processes is just for a single neuron. As such, training a neural network is extremely complex and time consuming. This is especially true for researchers that use a computer workstation equipped with one or two special purpose GPUs. Even provided such a workstation, training a multiple layer neural network may be time and cost prohibitive.

One approach to reducing the number of connections in a neural network is to use a convolution neural network (CNN). Convolution neural networks were inspired by biological processes in that the connectivity pattern between neurons resembles the organization of the animal visual cortex. Individual cortical neurons respond to stimuli only in a restricted region of the visual field known as the receptive field. Each convolutional neuron processes data only for its receptive field. The convolution operation brings a solution to the problem of processing for a large number of neuron connections as it reduces the number of free parameters, allowing the network to be deeper with fewer parameters. For instance, regardless of image size, tiling regions of size 5×5, each with the same shared weights, requires only 25 learnable parameters.

The layers of a Convolution Neural Network have neurons arranged in three dimensions. The neurons in a layer are connected to only a small region of the previous layer, which is the receptive field. Distinct types of layers are stacked to form a Convolution Neural Network architecture. Convolution Neural Networks exploit spatial locality by enforcing a local connectivity pattern between neurons of adjacent layers. The architecture includes non-linear filters that become increasingly global (i.e. responsive to a larger region of pixel space) so that the network first creates representations of small parts of the input, then from them assembles representations of larger areas. Subsequently, Convolution Neural Networks have lower memory requirements for running the network and allow for the training of larger, more powerful networks.

Convolution Neural Networks have been used to play board games such as checkers, backgammon, and Go, and video games such as Atari games. However, much research is still required for real-world problems such as computer vision in robots and self-driving cars. One approach that has been taken for real-world problems of computer vision for robots and self-driving cars is a form of machine learning known as reinforcement learning. Although much progress has been made in Convolution Neural Networks for game playing, more complicated environments such as playing video games, computer vision in robots and self-driving cars has reached the same complexities as before, in particular the curse of dimensionality. Unfortunately, real-world problems lead to a combinatorial explosion in complexity. Even with the most advanced computational resources, training using reinforcement learning for difficult real-world problems is still essentially intractable, much less training for real-world problems. For example, about 17 days of training using simulations were required to learn to play a computer game called Dota Five, and it achieved a 99.5 success rate. In order to advance to 99.99 success rate, it may require several years of training.

Reinforcement learning is hard because, unlike supervised learning where an agent is taught what actions to take (output is known), in reinforcement learning the agent must discover what actions achieve the highest rewards by attempting actions. Also, the immediate actions taken affect the next state of the environment. Also, reinforcement learning for real-world problems relies on high-dimensional imagery inputs to aid developed AI agents in making accurate decisions while performing their tasks. With such inputs and sophisticated algorithms, it has become mandatory to have very powerful computing machines for the training of those agents.

An example of a reinforcement learning algorithm is Q-learning of a Deep Q-Network (DQN). In Q-learning, when an action is performed in a state of the environment, it is preferable to choose an action that will maximize a future reward. In other words, a future reward needs to be predicted. A Q-value for a target may be defined as an action-value function approximating an expected reward for a state and action from a strategy of actions including a next action. A Q-function may be approximated by a neural network and used to determine the Q-value of a state and an action, and subsequently select actions to be performed on an environment to move the environment between states.

Since it is generally not possible to fully understand a current situation in a temporal environment based only on a current state, the Deep Q-Network considers sequences of actions and observations and learns based on these sequences. In the Deep Q-Network, the environment may be image frames and a situation may be understood by a sequence of image frames. However, the complexity of a neural network required to process a sequence of frames is very great even with computing power in present GPU's. One way to reduce the complexity of training a neural network is to reduce the quantity of data to be processed, In order to reduce the quantity of data to be processed, techniques including frame-skipping and down-sampling captured images have been employed.

In literature, in order to measure the performance of developed AI agents, researchers tend to test the agents against a variety of benchmarks. In Deep Reinforcement Learning (DRL), the aim of the algorithms is to develop agents that can solve complex problems without any intervention from humans by observing the environment and performing actions accordingly. As mentioned above, this adds an extra level of complexity to DRL algorithms over supervised learning algorithms since the only input provided to the agent is high-dimensional sensory input extracted from the environment. In research and in order to test the performance of the DRL agents, researchers tend to test them against games or simulations, such as video games where the frames of the game it tries to solve represent the inputs given to the agent. One approach an agent may take to handle these inputs is by utilizing Convolutional Neural Networks (CNNs), as CNNs are best suited for handling images and extracting meaningful features from them. When used in DRL algorithms, they are used to act as value function approximators that help the agent measure the effectiveness and usefulness of each possible action in order to decide what action to take. However, the architecture of the CNNs increases in complexity as the problems the agent tries to solve become more complex. This comes from the sophisticated features it needs to extract and the amount of information required in order to solve such games. This sophistication increases the demand on processing power and it further increases the time required to train.

The complexity of video games and real-world problems comes from the fact that they can be considered partially observable if the input given to the agent from the environment is only one single frame at a time. This can make it difficult on the agent to infer useful information and develop good behaviors because the same frame can have different meanings in non-similar contexts. This approach has made it difficult on the agent to fully understand the situation it is facing, and over complicates the training process.

As mentioned above, one of the ways to overcome the problem of inferring useful information has been to consider the state of the environment to be a sequence of observations, which are frames in the case of video. This approach has been taken using the CNN provided with an input of a stack of frames. When the CNN is fed with the stack of frames it can deduce a meaningful progression of information from the temporal aspects of the video. However, changing the input of the CNN from a single frame to a stack of frames again increases the complexity of the CNN and therefore increases the demand on processing power needed to train the agent. Moreover, the complexity of the CNN increases as the number of frames in the stack increases. One solution has been to limit the number of frames to, for example, four frames.

The DQN algorithm is described in Methods and apparatus for reinforcement learning, US20150100530A1, incorporated herein in its entirety. The DQN algorithm is also described in Papers:

Mnih, V., Kavukcuoglu, K., Silver, D., Rusu, A. A., Veness, J., Bellemare, M. G., & Petersen, S. (2015). Human-level control through deep reinforcement learning. Nature, 518(7540), 529, herein incorporated by reference in its entirety. Mnih, V., Kavukcuoglu, K., Silver, D., Graves, A., Antonoglou, I., Wierstra, D., & Riedmiller, M. (2013). Playing atari with deep reinforcement learning. arXiv preprint arXiv:1312.5602, herein incorporated by reference in its entirety. It is one object of the present disclosure to describe a deep learning network having a preprocessing step that improves the performance of the DQN algorithm where the environment is in the form of video images. It is another object of the present disclosure to reduce the computing power necessary to perform the DQN algorithm on video frame images.

SUMMARY

In an exemplary embodiment, a reinforcement learning method performed by processing circuitry, including obtaining and storing video frames in a video memory, performing, by the processing circuitry, a first preprocessing step of retrieving a sequence of n image frames of the stored video frames, and merging the n image frames in a fading-in fashion by incrementally increasing the intensity of each frame up to the most recent frame having full intensity to obtain a merged frame, and performing, by the processing circuitry, a training step of inputting the merged frame to a Deep Q Neural Network (DQN) and training the DQN to learn Q-values for all possible actions from a state represented by the merged frame with only a single forward pass through the network.

In another exemplary embodiment, a reinforcement learning apparatus, comprising a video memory configured to store video frames, preprocessing circuitry configured to retrieve a sequence of n image frames of the stored video frames, and merge the n image frames in a fading-in fashion by incrementally increasing the intensity of each frame up to the most recent frame having full intensity to obtain a merged frame, a Deep Q Neural Network (DQN) configured to receive the merged frame and perform a training process to learn Q-values for all possible actions from a state represented by the merged frame with only a single forward pass through the network.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
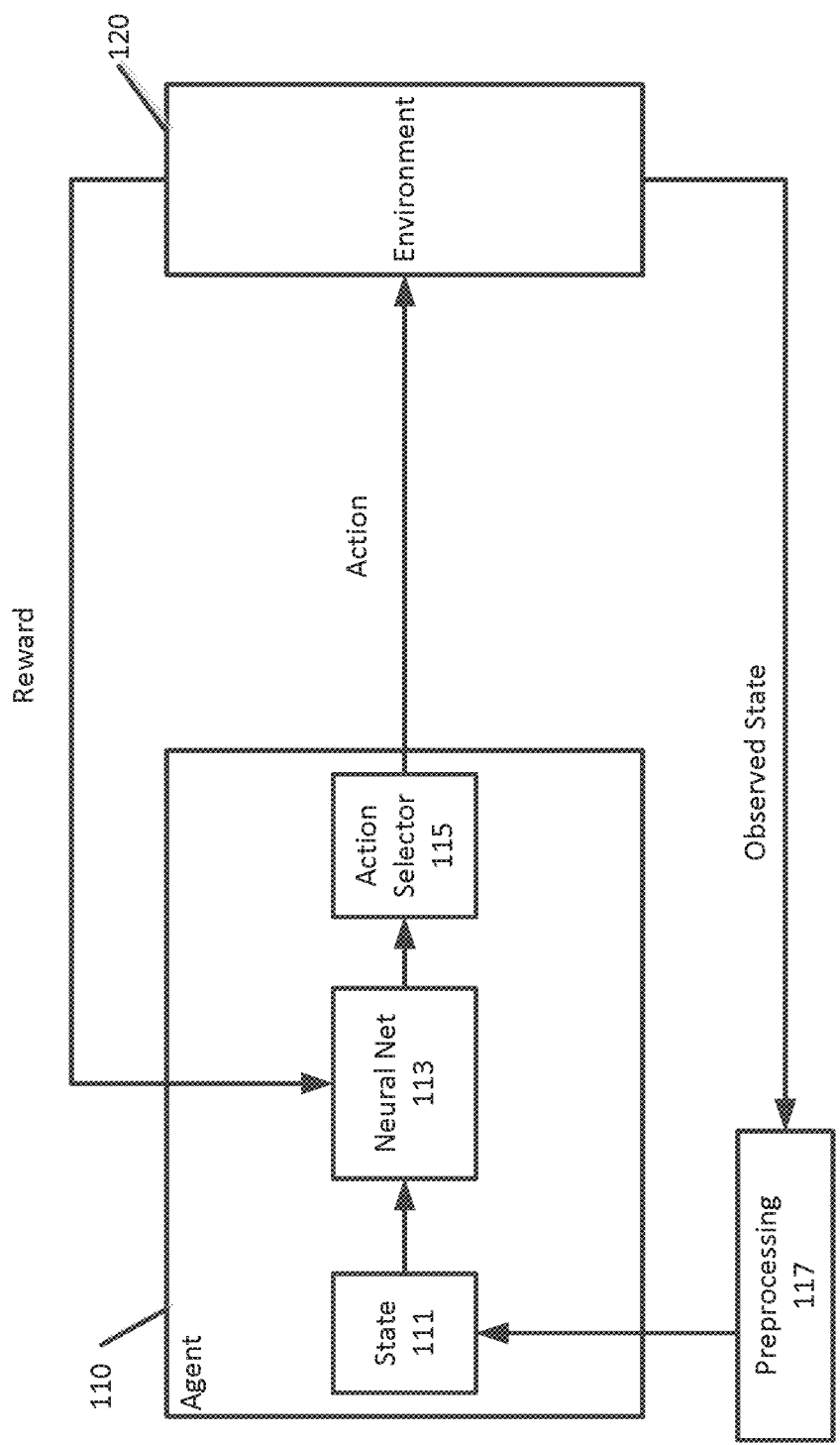
FIG. 1 is a block diagram for a Reinforcement Learning Deep Q-network-based system in accordance with an exemplary aspect of the disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a deep learning reinforcement learning network that includes a preprocessing step that is an improvement over the deep Q-network (DQN) algorithm for processing video images. This disclosure is not limited to the DQN algorithm. The disclosure can be applied to any DRL algorithm that uses CNN as its core value function approximator and that utilizes a stack of frames to overcome the partial observability issue. For example, the disclosure may be applied to improved versions of the DQN algorithm, such as the double DQN algorithm and the dueling DQN network.

An aspect of this invention is a technique that can reduce the complexity of DRL algorithms. This reduction in complexity maintains the accuracy of the developed models such that even though it reduces the overall training time and processing power required, it preserves the performance of the trained models and may even enhance them. Furthermore, the technique provides a solution to the partial observability issue that occurs when the DRL is trained based on one frame at a time.

An aspect of the disclosed technique involves merging a stack of frames into one frame before passing it to the CNN. However, by only merging the stack of frames without any preprocessing, the same effect as using one frame or even worse the merged frame may be ambiguous. The agent will again be unable to infer any information about the environment and hence it will become again partially observable. In order to eliminate the ambiguity resulting from using the merging technique is to reduce the intensity of the frames as they get older. This will give the agent information on how the environment has been changing using the features learned in the CNN.

FIG. 1 is a block diagram for a Reinforcement Learning Deep Q-network-based system in accordance with an exemplary aspect of the disclosure. To begin, the environment 120 will be in a certain state (which could be the location of objects in a scene). The determination of the state based on a scene may require preprocessing 117. The agent 110 can perform certain actions in the environment 120 (e.g., move an object). The actions may result in a reward (e.g. increase in score). Actions transform the environment 120 and lead to a new state 111, and the agent can perform a new action. The rules (Action Selector 115) for how to choose an action are called policy. The set of states and actions, together with rules for transitioning from one state to the next, make up a decision process. The decision process is based on an assumption that the probability of the next state depends only on the current state and action and not preceding states and actions. To perform well in the long-term, the system needs to take into account not only the immediate rewards, but also future rewards. There is no guarantee that the same rewards will be issued the next time the same actions are performed. Thus, one approach is to use discounted future rewards. A strategy that an agent takes is to choose an action that maximizes a future reward.

Q-learning uses a function representing the maximum discounted future reward when performing an action in a state. It is called a Q-function because it represents the quality of a certain action in a given state. In disclosed embodiments, the Q-learning is implemented as a deep neural network 113 (referred to as a deep Q-network).

Figure 2:
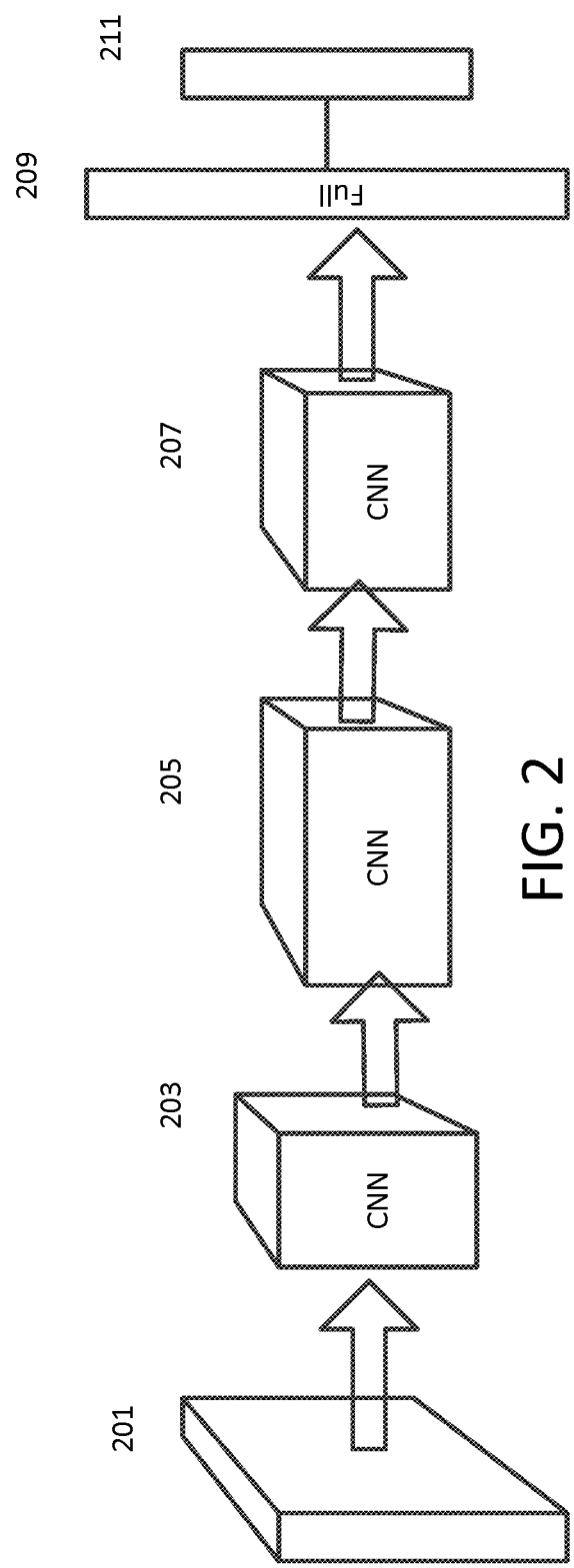
FIG. 2 is a diagram of a Deep Q-network architecture in accordance with an exemplary aspect of the disclosure.

FIG. 2 is a diagram of a Deep Q-network architecture in accordance with an exemplary aspect of the disclosure. A set of input frames 201 provides an input to a first convolution network 203 having a set of convolutional filters formed by connections to a first hidden layer. First hidden layer contains a set of feature maps, one for each filter. A second convolution network 205 having a set of convolutional filters provides connections to a second hidden layer which comprises a further set of feature maps, one for each of filters. The output stage of neural network comprises, in effect, a multilayer perceptron 207 with a set of input hidden units connected to all the feature maps in layer 209, and having a set of output units 211, one for each available action. In an example the first set of 4×16 8×8 pixel filters (kernels) operating on the set of (84×84) (×4) input frames generates a set of 16 20×20 feature maps for each set of 4 frames, and the second set of 16×32 4×4 pixel filters operating on these generates 32 9×9 feature maps for each frame. The neural network structure of FIG. 2 corresponds to the arrangement shown in FIG. 1, in which state data 111 presented at the input of the neural network 113 generates a set of Q-value outputs on output units 211, one for each action.

Figure 3:
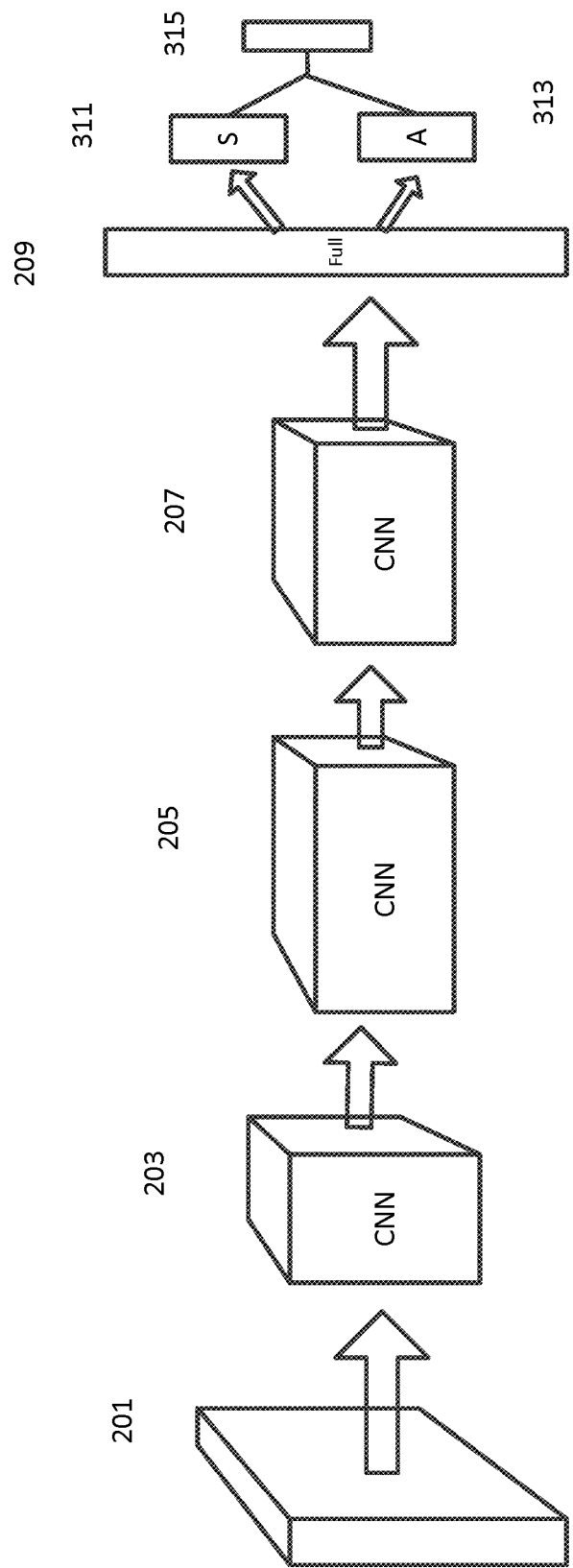
FIG. 3 is a diagram of a Dueling Deep Q-network architecture in accordance with an exemplary aspect of the disclosure.

FIG. 3 is a diagram of a Dueling Deep Q-network architecture in accordance with an exemplary aspect of the disclosure. The dueling network has two streams to separately estimate state-value 311 and the advantages 313 for each action. The output network 315 combines the state-values 311 and the advantages 313, to output one value for each action.

Another form of Deep Q-network is a Double Deep Q-network having a first Q-network and a second Q-network. The first Q-network is used to select actions. The second Q-network is used to evaluate the actions.

Figure 4:
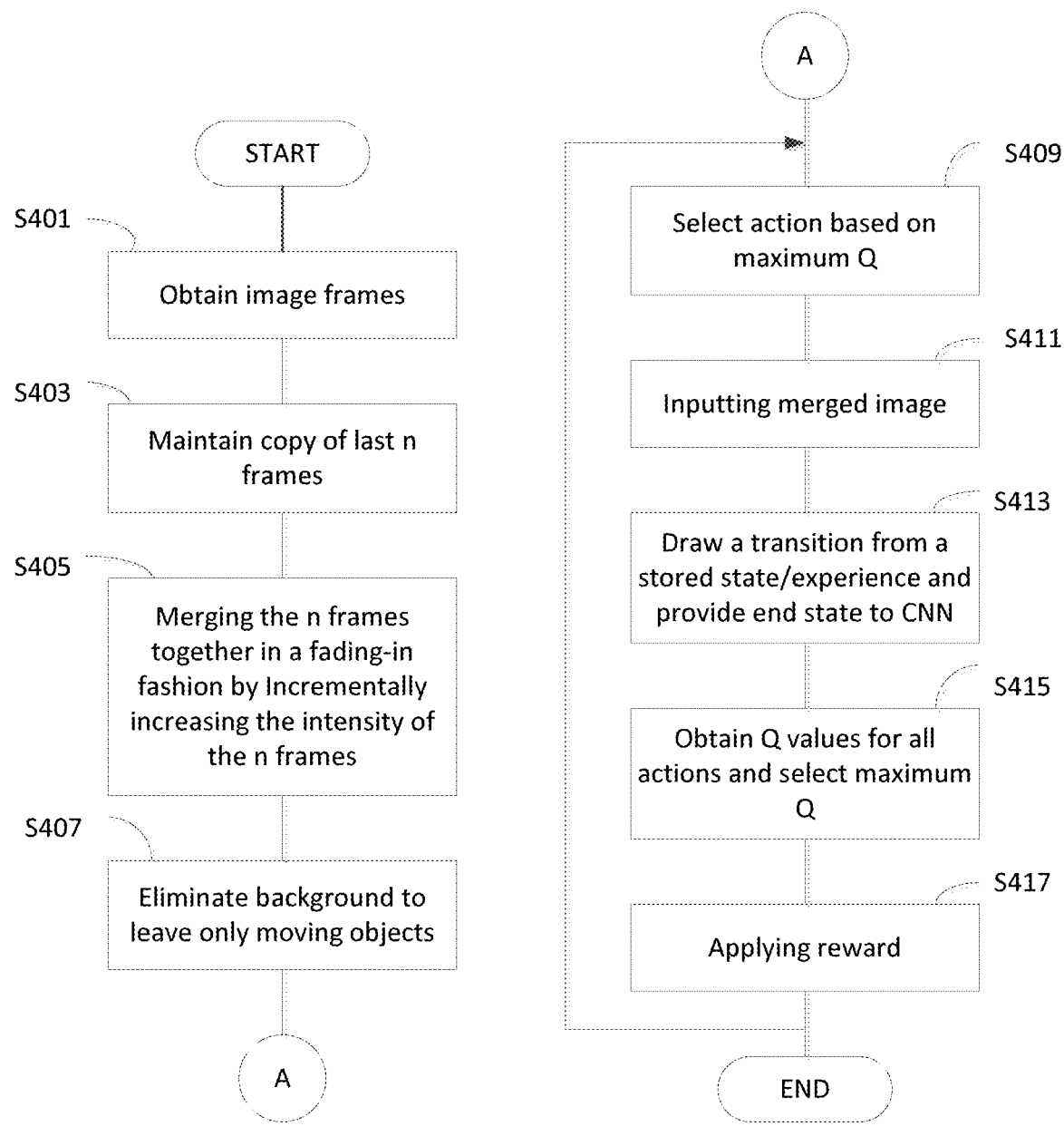
FIG. 4 is a flowchart of operation of the Reinforcement Learning Deep Q-network in accordance with an exemplary aspect of the disclosure.

FIG. 4 is a flowchart for the method in accordance with an exemplary aspect of the disclosure. For purposes of explanation, the method is described using the Pong video game as an example operation. Video images may be played at various resolutions and frame rates. For example, a 4 K video may have a resolution of 3840×2160 pixels and may be played at a typical frame rate of 20 FPS (Frames Per Second). Both resolution and frame rate vary based on available hardware, display type and hardware settings. When reinforcement learning is employed, the frame rate may be reduced for purposes of training. In the example Pong video game, both the resolution and the frame rate were relatively low. As will be discussed later, other video games with higher resolution and frame rate were tested as well.

In some embodiments, the preprocessing 117 may be performed by a general purpose computer having a central processing unit (CPU). In some embodiments, the general purpose computer may include a special purpose GPU. In this disclosure, the CPU and GPU, as well as associated memory and management thereof, may be referred to as processing circuitry. The processing circuitry may be employed to perform the procedure in FIG. 4.

Figure 5:
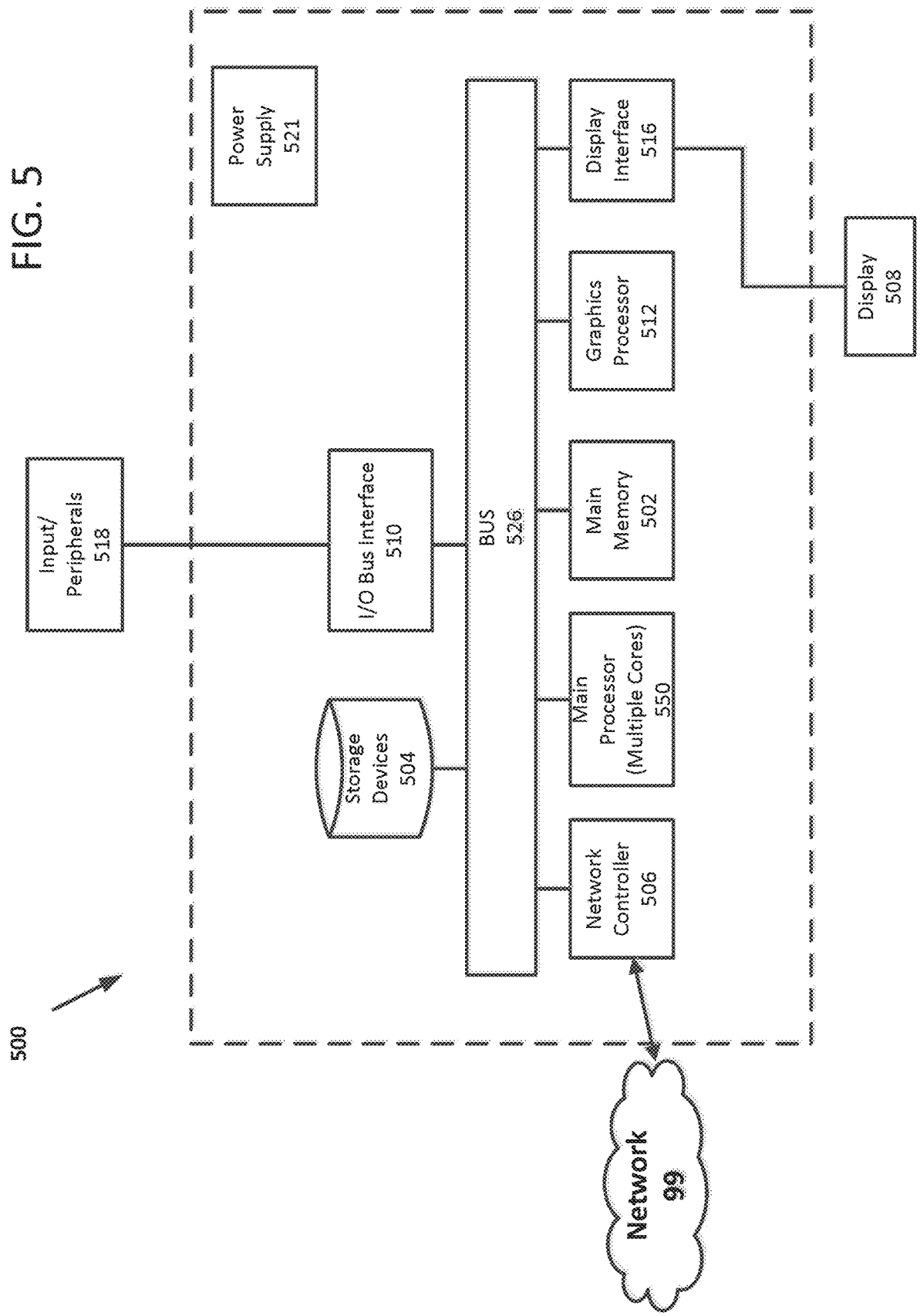
FIG. 5 is a block diagram illustrating an example computer system for implementing the reinforcement learning method according to an exemplary aspect of the disclosure.

FIG. 5 is a block diagram illustrating an example computer system for implementing the reinforcement learning method according to an exemplary aspect of the disclosure. The computer system may be a workstation running an operating system, for example Windows (e.g., Windows 10), a version of Unix OS, or Mac OS. The computer system 500 may include one or more processing cores 550 and a graphics processor 512. The graphics processor 512 may perform many of the mathematical operations of the disclosed procedure. The computer system 500 includes main memory 502, typically random access memory RAM, which contains the software being executed by the processing cores 550 and graphics processor 512, as well as a non-volatile storage device 504 for storing data and the software programs. Several interfaces for interacting with the computer system 500 may be provided, including an I/O Bus Interface 510, Input/Peripherals 518 such as a keyboard, touch pad, mouse, Display Interface 516 and one or more Displays 508, and a Network Controller 506 to enable wired or wireless communication through a network 99. The interfaces, memory and processors may communicate over the system bus 526. The computer system 500 includes a power supply 521, which may be a redundant power supply.

The graphics processor 512 may perform certain mathematical operations related to image processing. The graphics processor may be a video card that is connected to the motherboard of the general purpose computer via a bus. Commercial video cards and GPUs include those made by Nvidia and AMD, and GPUs include those made by Intel.

Regarding FIG. 4, in S401, video image frames are input to the computer and, in S403, n video frames are stored in a video memory (e.g., a video memory in the video card). Video cards may have different sizes of memory, typically ranging from 4 GB on up. The number of video frames that may be stored and processed in a video card may depend on the amount of available video memory and desired FPS.

Figure 6:
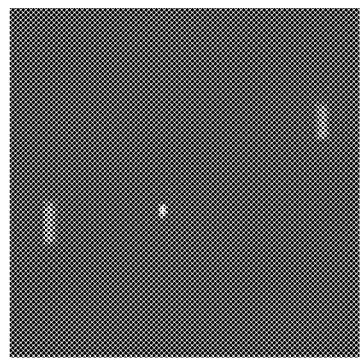
FIG. 6 is a single frame from the Pong game and demonstrates how it can be ambiguous to determine the state of the environment
Figure 7:
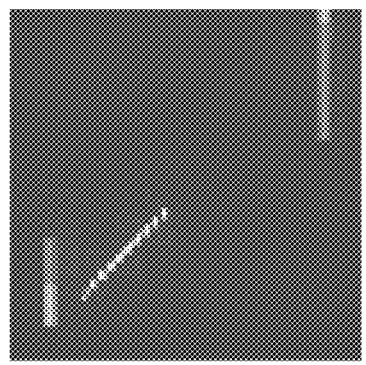
FIG. 7 is an image from the Pong game resulted from merging ten frames. However, in this case, the merging technique does not reduce the intensities of frames as they get older and hence demonstrates how it can be ambiguous to determine the state of the environment.
Figure 8:
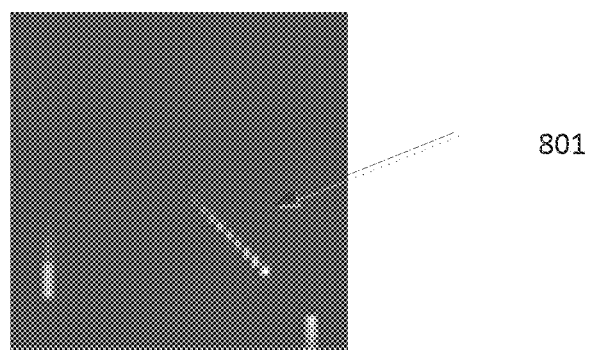
FIG. 8 is an image from the Pong game resulted from merging ten frames with the intensity reduction which gives more information about the state of the environment.
Figure 9:
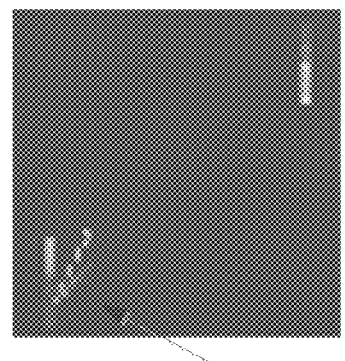
FIG. 9 is an image demonstrating how the merging technique can help in understanding the state of the environment. In this case, it shows the direction of the ball in addition to its speed.
Figure 10A:
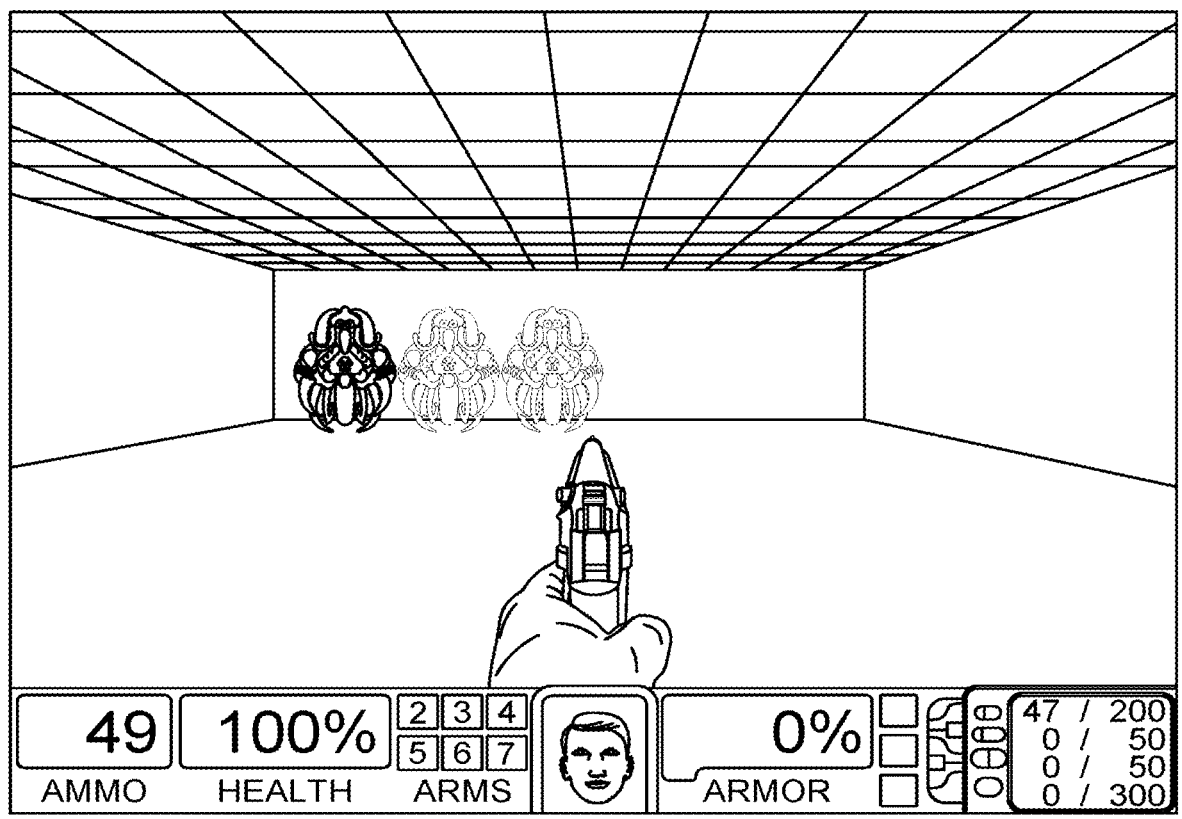
FIGS. 10A, 10B, 10C, 10D are images illustrating the application of the merging technique on VizDoom game.
Figure 10B:
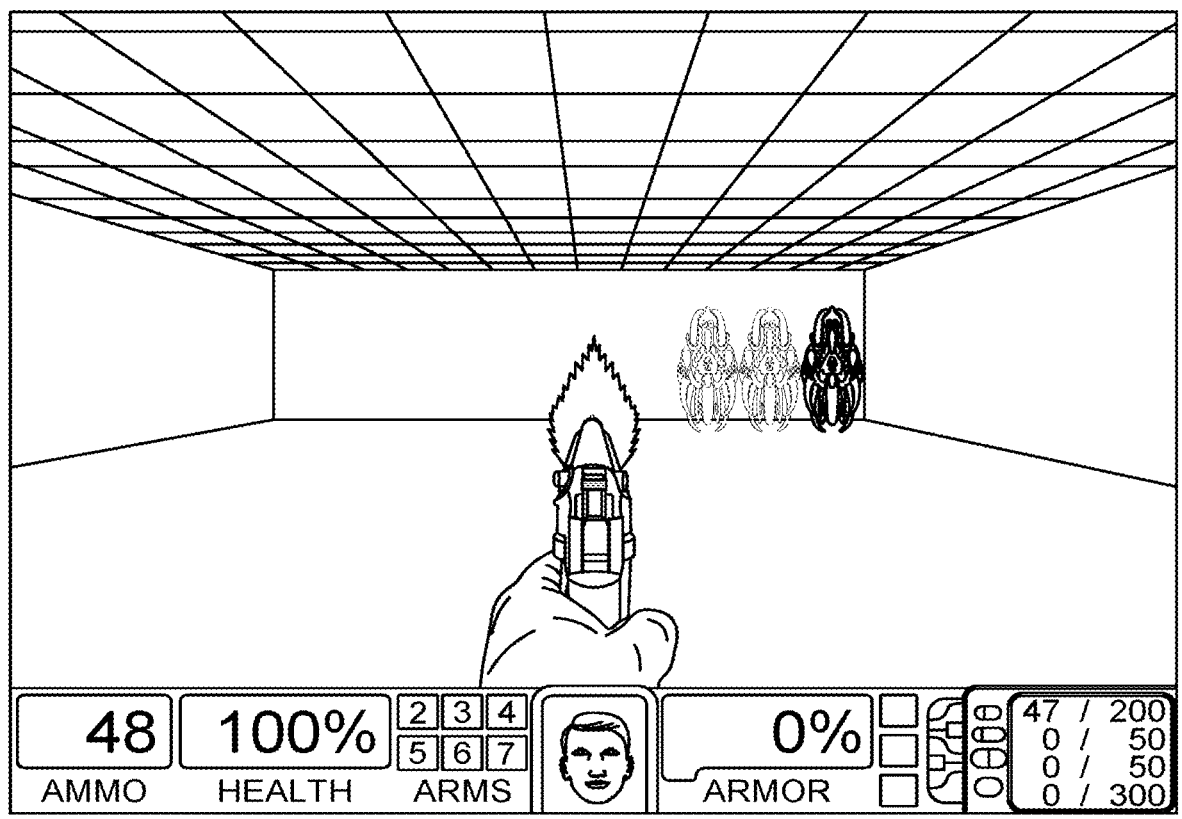
Figure 10C:
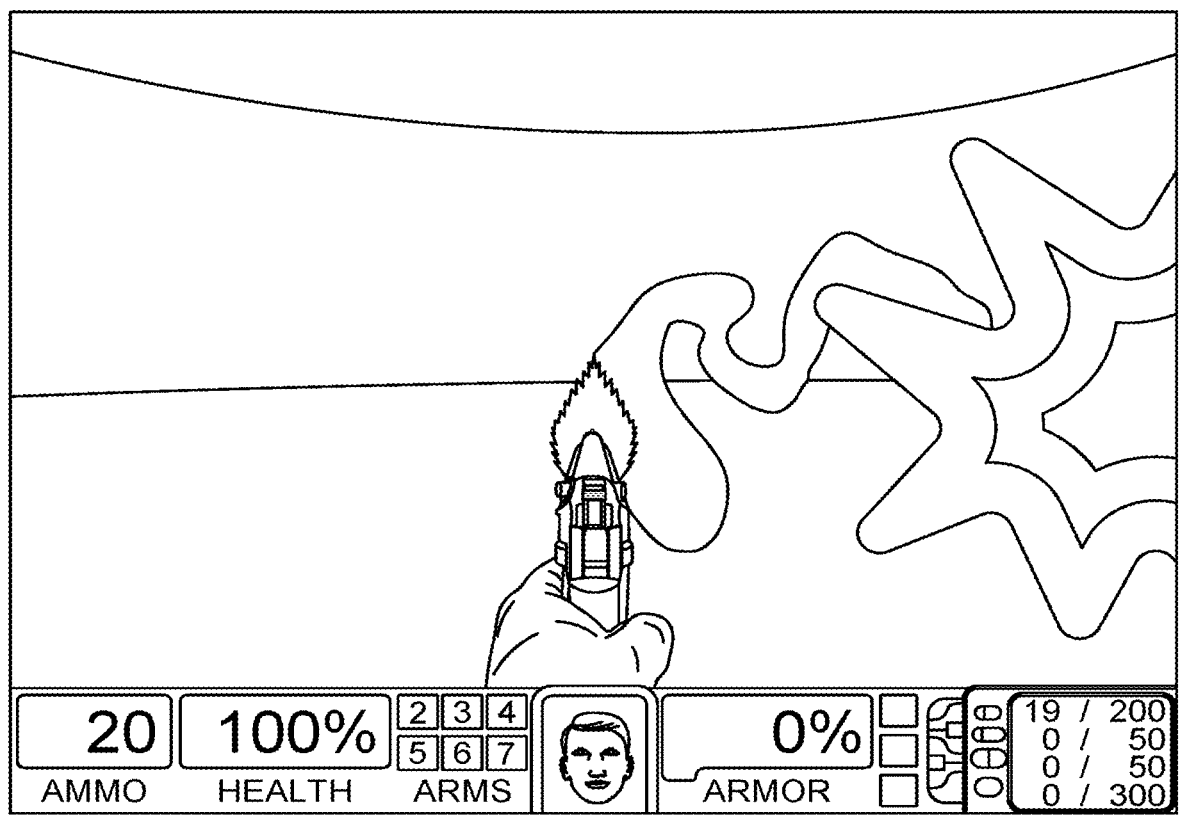
Figure 10D:
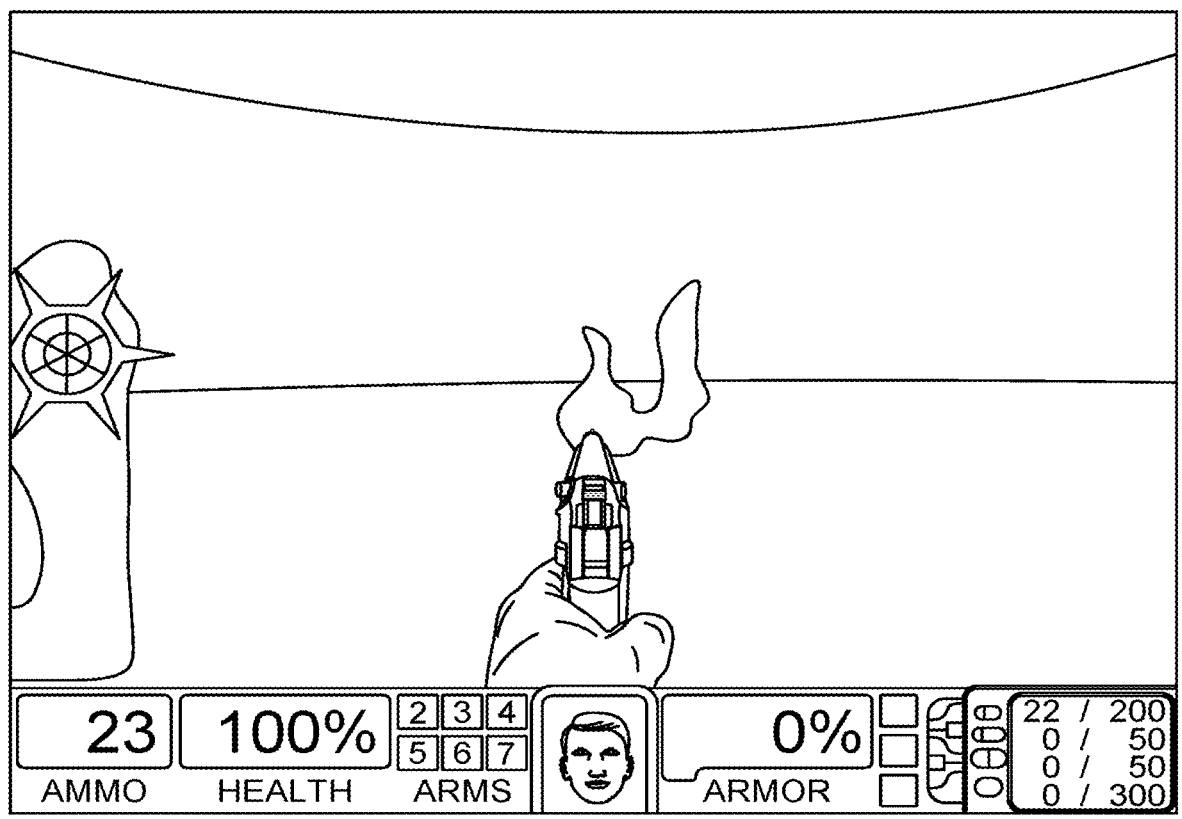

FIG. 6 illustrates a single frame from the Pong video game. However, this frame can be considered ambiguous in a sense that it does not provide the agent with any information either about where the ball is heading to or the speed of the ball. Therefore, the agent cannot predict accurately the necessary action to take. This ambiguity would remain if a stack of frames is merged into one frame. FIG. 7 illustrates the result of merging a stack of frames into one frame. Therefore, and in order to solve this issue, the intensity of the n frames may be incrementally reduced as they get older and merged into one frame. This effect would result in a frame 801, for example as illustrated in FIG. 8. With this modification, as shown in FIG. 9, the direction of movement can be realized by following the direction opposite to the fading-out. Also as shown in FIG. 9, spaces between the balls' positions 801 indicate speed. The technique requires the agent to store, in S403, in video frame memory, a copy of the last n frames (depending on the size of the history) and then, in S405, the GPU may perform an operation to merge them together in a fading-in fashion by incrementally increasing the intensity of the frames until it reaches to the most recent one with full intensity. The number of frames n can be selected based in the problem the agent is trying to solve.

In an embodiment, the amount of incremental increase in intensity may be determined as a ratio of the number of frames. For example, when the number of frames is ten, the amount of incremental increase may be ten percent. The intensity of the oldest frame may have a minimum intensity, such as 20 percent, so that the oldest frame includes an image of at least some minimum intensity. The incremental increase may then start from the frame having the minimum intensity.

In an embodiment, the intensity of each pixel in video frames may be normalized so that the frames will have a similar range of pixel values. For example, all frames may be adjusted to pixel intensity values in a range of 0 to 255 using linear normalization.

In an embodiment, the contrast of each video frame may be increased before incrementally increasing the intensity of each frame.

An advantage of the merging technique over the stack of frames DQN is that the number of frames used in the merge can be increased beyond four frames without affecting either the architecture of the CNN or the training time required. Once the frame generated by merging the old frames is ready it may be fed to the CNN 113 for value approximation. The merging technique was tested with the Pong video game as shown in FIG. 8 and FIG. 9. In addition, this merging technique was tested with the VizDoom video game as can be seen in FIGS. 10A, 10B, 10C, 10D.

The merging technique may be further improved by implementing another preprocessing step. Previously, DQN trained with the stack of frames relied on four separate frames for approximating the value function. Each one of these frames was in full intensity. Therefore, the information presented in each one of the frames maintained its strength and effect. However, in the disclosed technique, the information embedded within the frames loses its strength because of the intensity reduction in the direction of older frames. Furthermore, the background color in the frame causes the feature information to be cluttered with non-essential information as the data moves deeper in the CNN and hence reduces the effectiveness of the frame merging technique.

Figure 11:
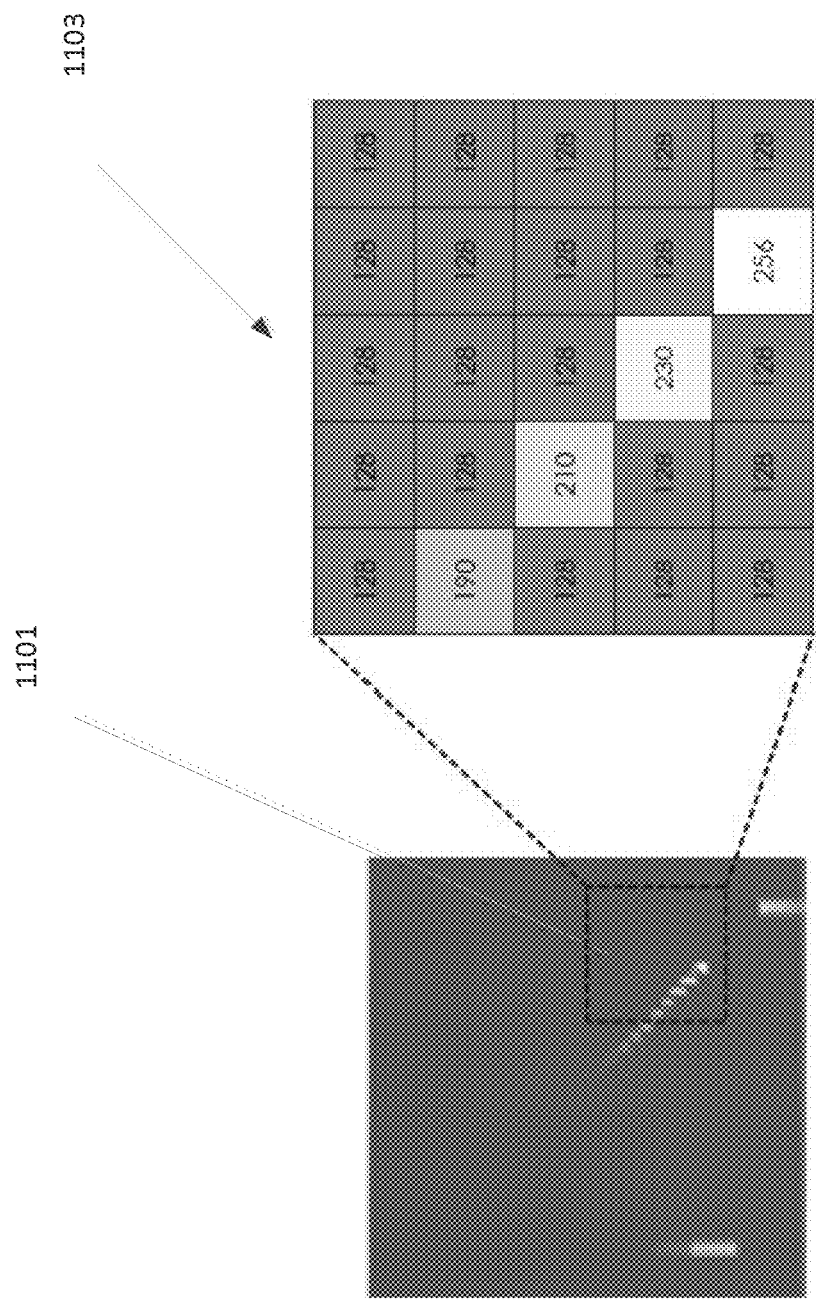
FIG. 11 illustrates the representation of an image in memory after applying the merging technique and demonstrates part of the values of the pixels in the image.
Figure 12:
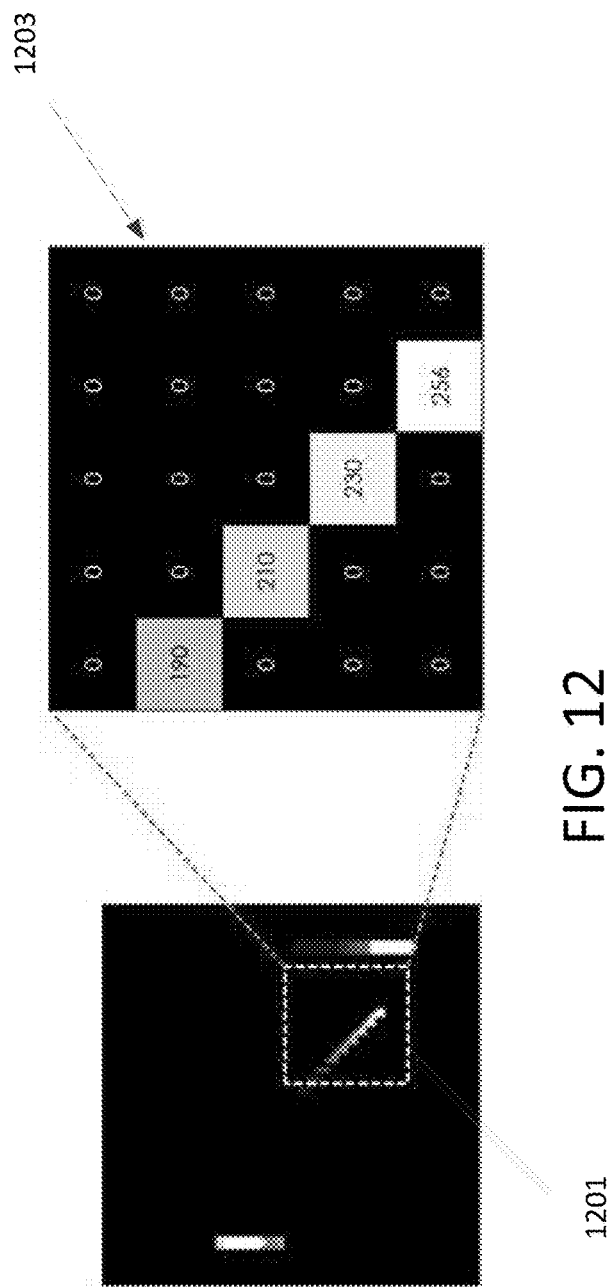
FIG. 12 is an image illustrating the effect of applying background removal on the representation of the merged frames in memory and demonstrates part of the values of the pixels in the image.
Figure 13:
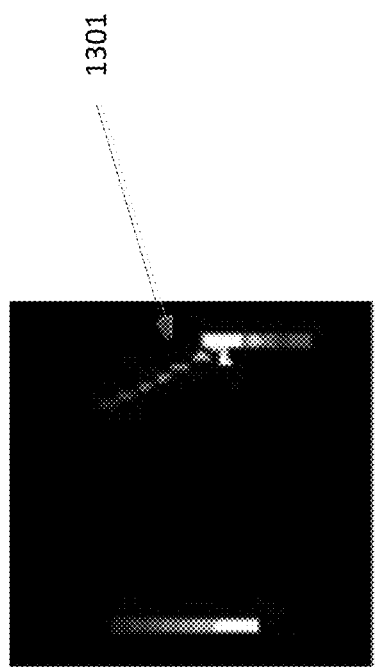
FIG. 13 an image from the Pong game resulted from merging ten frames in addition to background removal which provides clearer insight to the most important objects in the scene which are the ball and the two paddles in the case of Pong.

The representation of frames 1101 in computers appears as arrays of numbers 1103 where each pixel is represented in a cell. Since all the frames used in DQN are in gray scale then each cell in the array can have a value between 0 and 255 where the first value represents black while the other value represents the white color and the shades of gray are represented by the values in between as demonstrated in FIG. 11. Hence, the background in the merged frames can impact the extracted features because of its grey color. Therefore, in order to overcome this issue, in S407, the background may be removed from each frame and thereby eliminated from any calculations that can take place in the CNN. This preprocessing step can be performed using the video card in a background removal process and would result in only the relevant information in the frame. In one embodiment, the background of a frame may be removed by a process of background subtraction. In the Pong video game, for example, the only information left after background subtraction is the two paddles and the ball as shown in FIG. 12 and FIG. 13.

Provided the pre-processing (performed in preprocessing circuitry 117), steps S401 to S407, the DQN 113 may be trained. The procedure may begin by selecting an action for a state of the environment 120. In particular, in S409, the DQN 113 selects the maximum Q-value (i.e., having a maximum expected reward). In some embodiments, the procedure may also employ an exploration strategy, for example, a greedy strategy (selecting a random action). Many types of exploration strategies may alternatively be employed, for example, a soft-max strategy based on a Gibbs or Boltzmann distribution.

In S411, the procedure then inputs state (merged image) data. In some embodiments, the DQN may also store experience data in an experience memory data store, the experience data including before and after states, the action taken, and the reward earned. At step S413, the procedure draws a transition from the stored experience data, either randomly or according to a prioritised strategy, and provides the end state of the transition to the DQN. In S415, the DQN is employed to determine the maximum Q-value for this end state, by providing a Q-value for each action so that the maximum can be selected. In step S417, the procedure adds the reward from the transition to this end state, to provide a target Q-value. In this embodiment the reward is stored with the experience data and may be provided as part of the definition of a target region of state space to be within, or to avoid.

Data Analysis:

To ensure that the merging technique is implementation independent, it was tested using two different implementations of DQN. The first one was built using Python 2.7 and was based on an open-source skeleton implementation of DQN. This implementation was missing the core parts of DQN and only offered a guidance and some utility classes and functions that helped in memory management. The rest of the functionalities along with the core ones were implemented in order to have a fully functional DQN. The second implementation of DQN was based on the DQN baseline offered by OpenAI that was built using Python 3.5. However, even though two different implementations were used in the experiments, both implementations shared the same CNN architecture. Moreover, they both applied the same preprocessing step on the game frames. The following discusses the results of the conducted experiments on both implementations.

Figure 14:
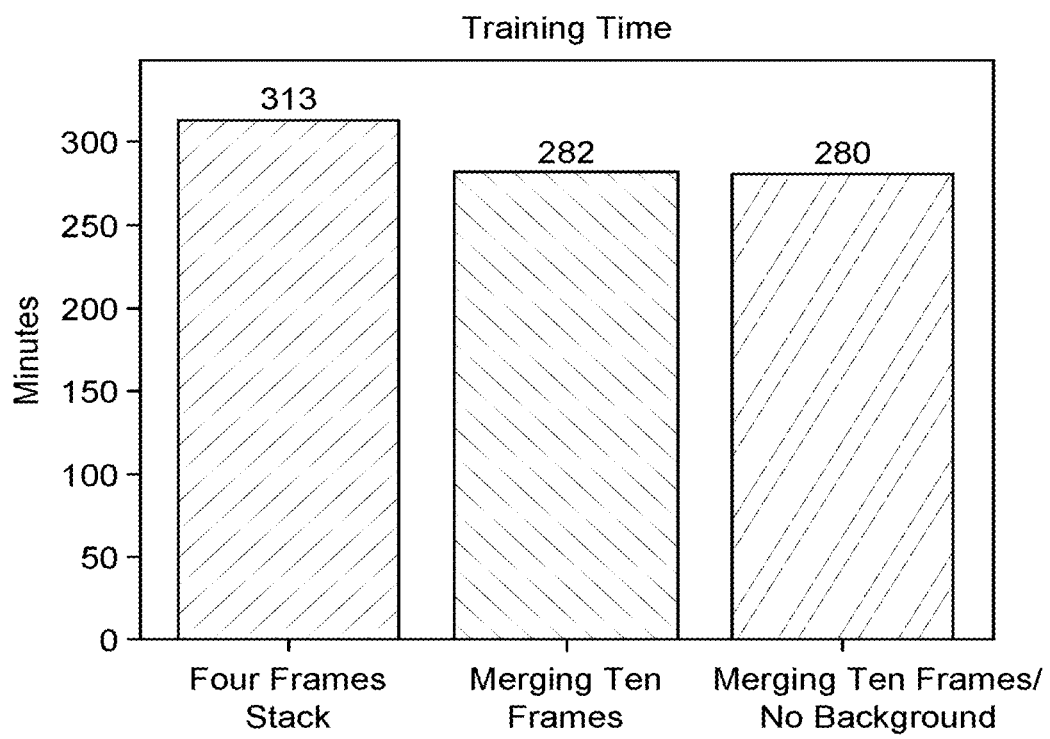
FIG. 14 is a chart of the merging technique with and without background removal using a skeleton DQN.
Figure 15:
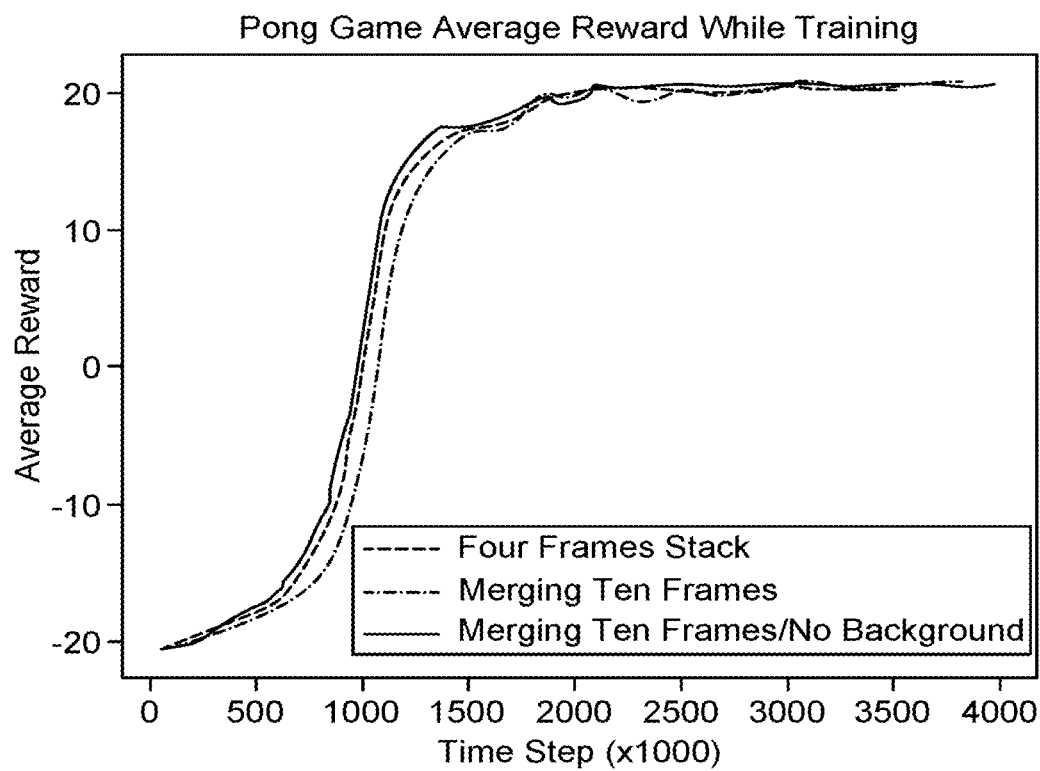
FIG. 15 is a graph of average reward while training in the Pong game using the skeleton DQN.

Skeleton DQN (Pong Video Game):

The first experiment was conducted to test the effect of the merging technique and the background removal on the skeleton DQN implementation. FIG. 14 shows that the merging technique in both cases with and without background removal required less training time by around 10% when compared to the stack version. However, when comparing the performance, the merging technique showed slightly less performance when compared to the stack version while the background removal increased its performance to become slightly better as shown in FIG. 15.

Figure 16:
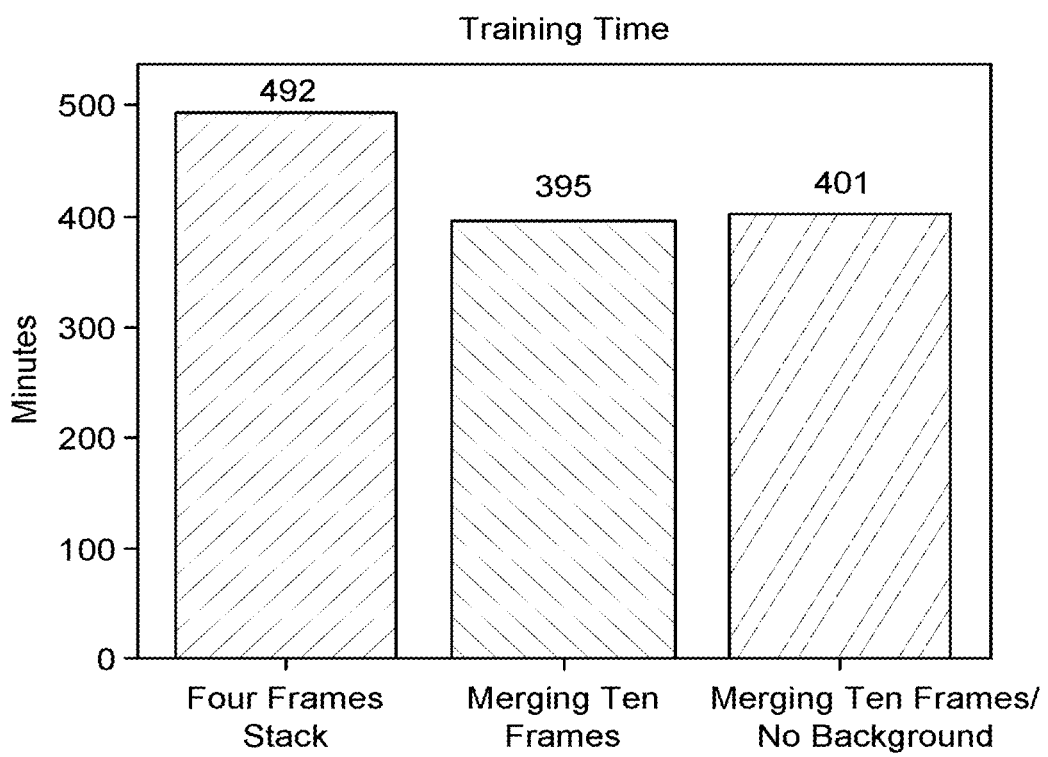
FIG. 16 is a chart of training time using a baseline DQN.
Figure 17:
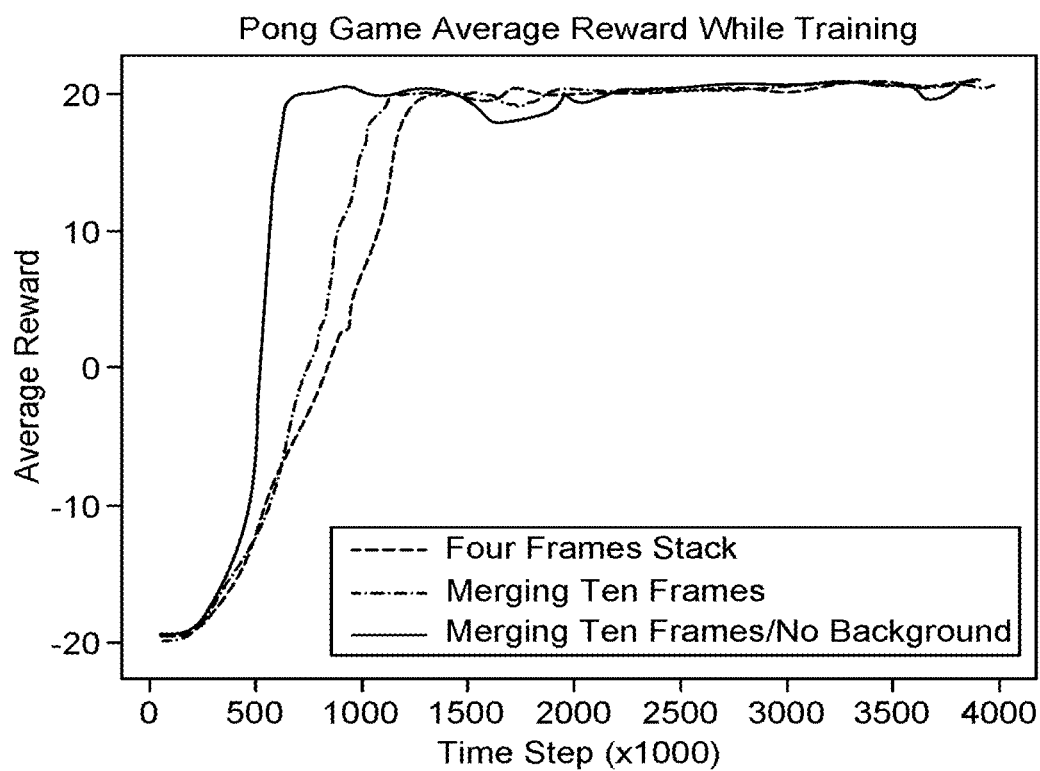
FIG. 17 is a graph of average reward while training in the Pong game using a baseline DQN.

Baseline DQN (Pong Video Game):

The aim of the second experiment was to test the effect of the merging technique and the background removal on a different implementation of DQN. FIG. 16 shows that the training time has been reduced by 18% to 20% based on keeping the background or removing it. As shown in FIG. 17, the reduction in time was accompanied with an increase in performance for both versions of the merging technique with a huge boost in performance when the background removal was applied.

Figure 18:
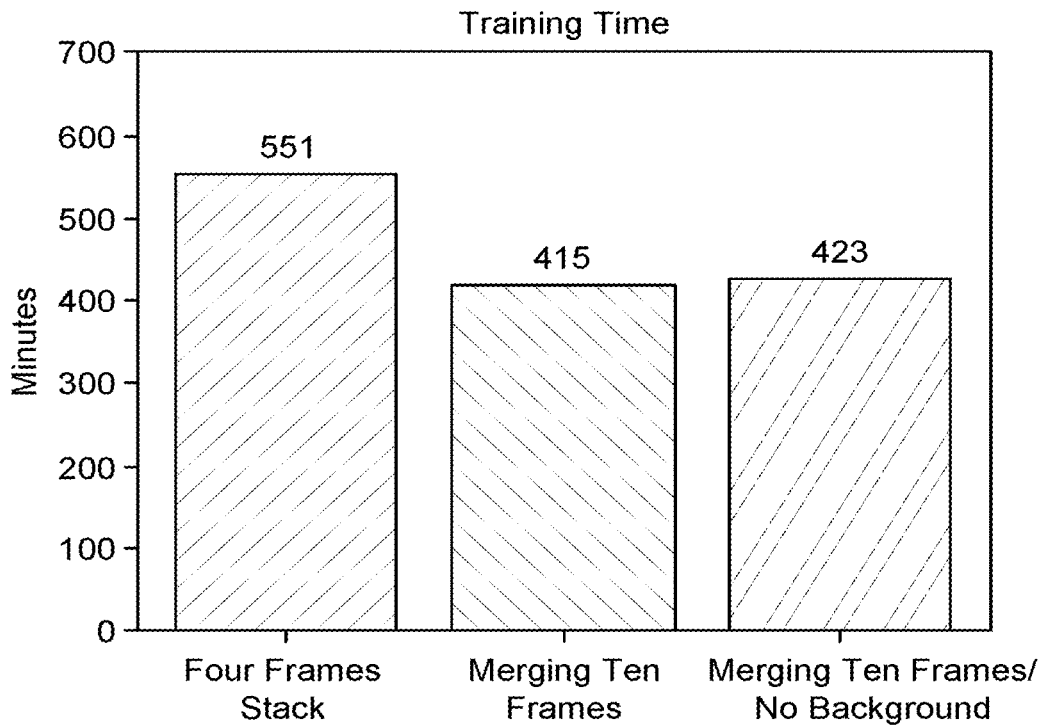
FIG. 18 is a chart of training time while training a double DQN.
Figure 19:
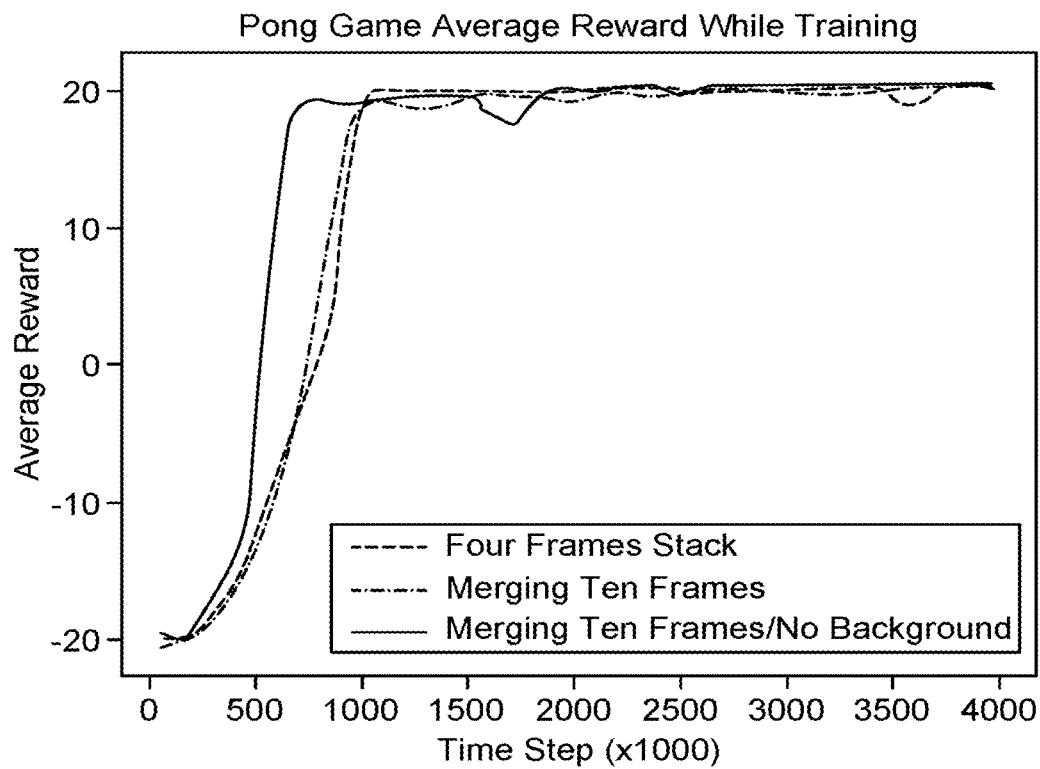
FIG. 19 is a graph of average reward while training in the Pong game using a double DQN.
Figure 20:
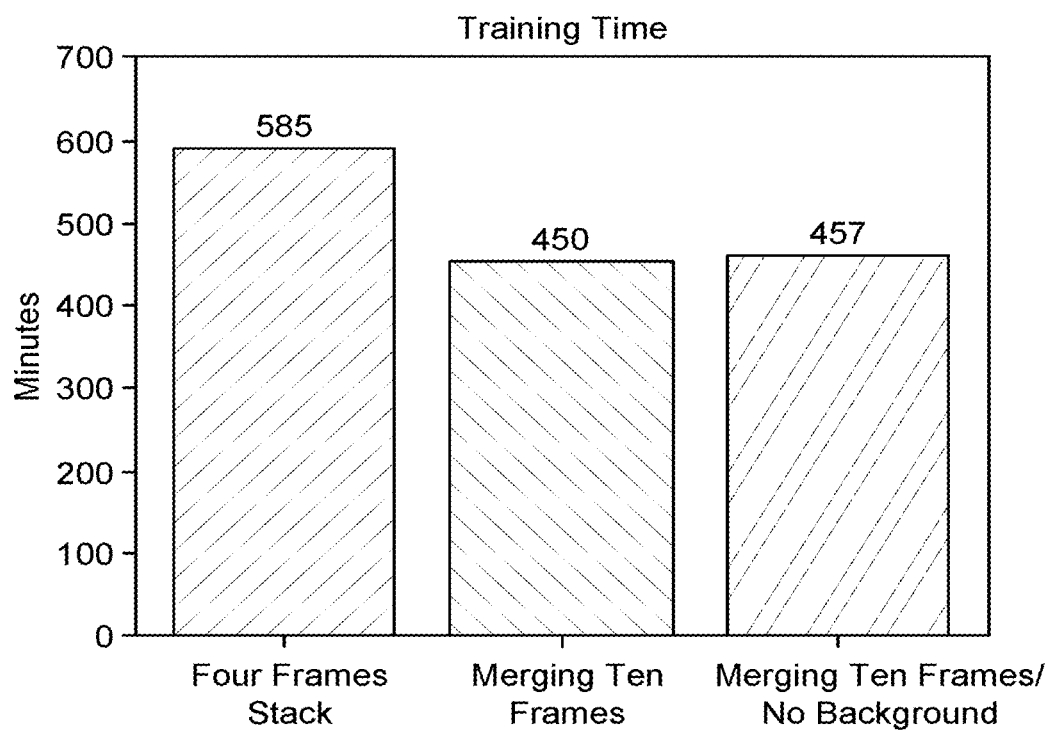
FIG. 20 is a chart of training time while training a dueling DQN.
Figure 21:
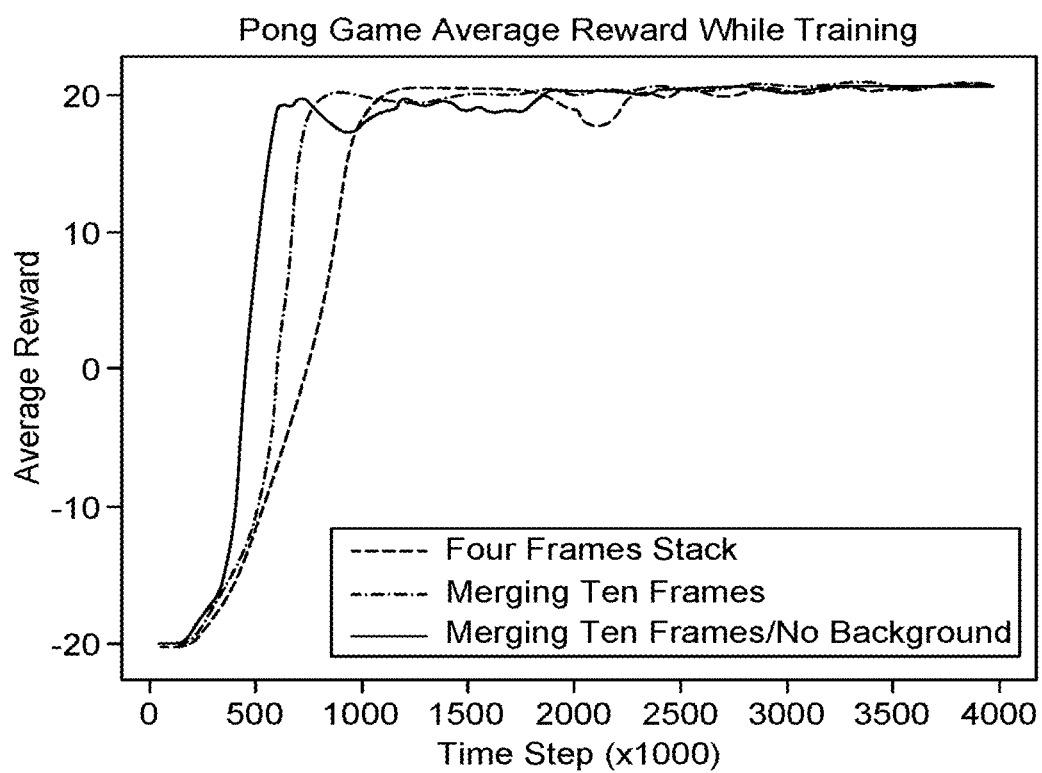
FIG. 21 is a graph of average reward while training in the Pong game using a double DQN.

Baseline Double DQN & Dueling DQN (Pong Game):

This experiment was conducted to test whether the merging technique can be extended to be applied on other algorithms that are based on DQN. The technique was tested on Double DQN and Dueling DQN from the baseline implementation. FIG. 18 shows that the training time for Double DQN has been reduced by around 23% to 25% based on keeping the background or removing it. In terms of performance, as shown in FIG. 19, the merging technique showed a slight improvement over the stack version while keeping the background. However, it gained a huge boost in performance when the background was removed. The experiments on Dueling DQN showed similar behavior of reduction in training time by 22% to 23% based on keeping the background or removing it and an enhanced performance for both versions as can be seen in FIG. 20 and FIG. 21.

Figure 22:
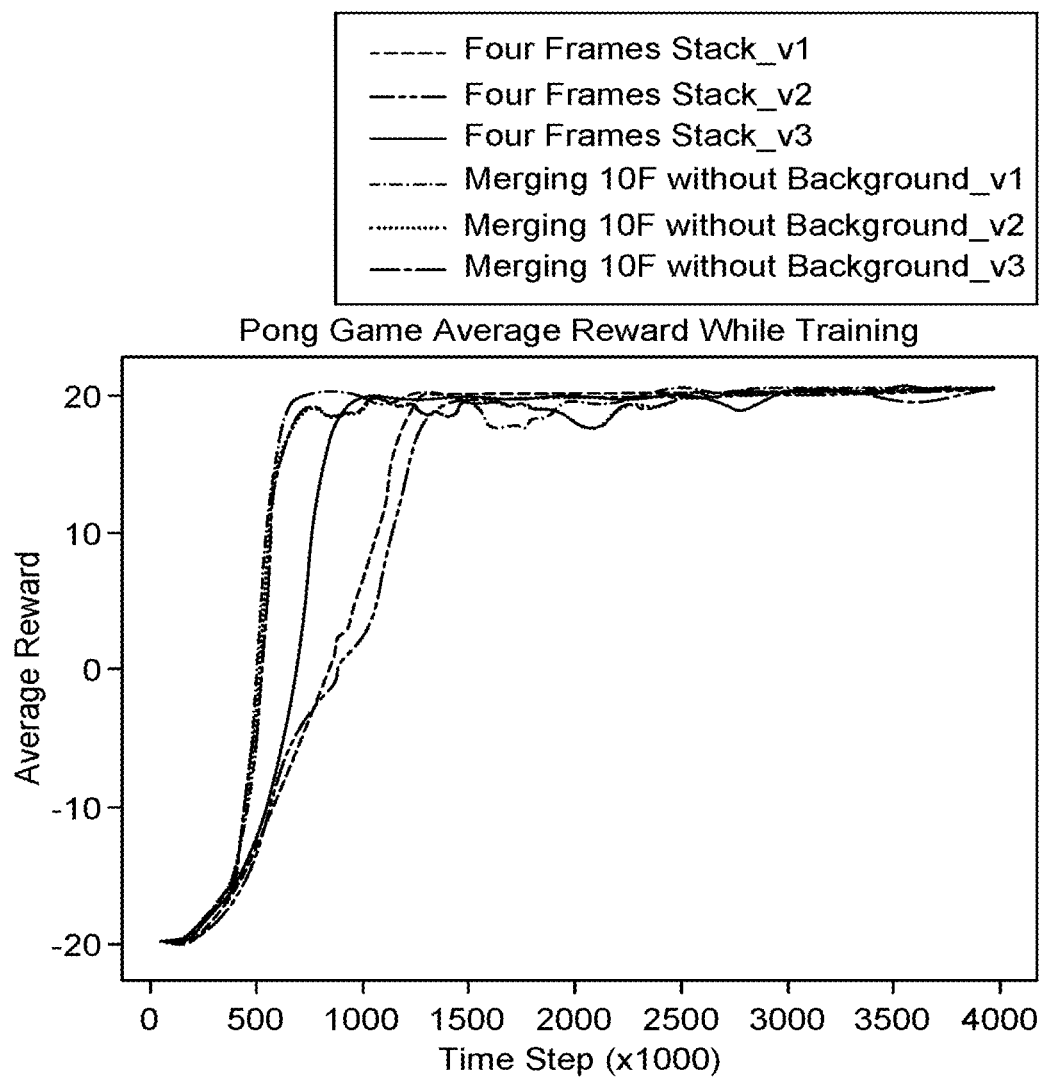
FIG. 22 is a graph of average reward while training the baseline DQN in multiple runs in the Pong game.

Baseline DQN (Pong Game—Multiple runs):

In order to further prove the findings and that the improvement of the merging technique with background removal does not get affected by the randomness in the environment, the baseline DQN was tested for three different times for the version of stack of frames and the version with the merging technique and background removal. In all three runs, DQN with the merging technique showed dominance in performance over the stack version as shown in FIG. 22.

Baseline algorithms (Pong Video Game—Trained 500 K steps, Tested 100 games)

Figure 23:
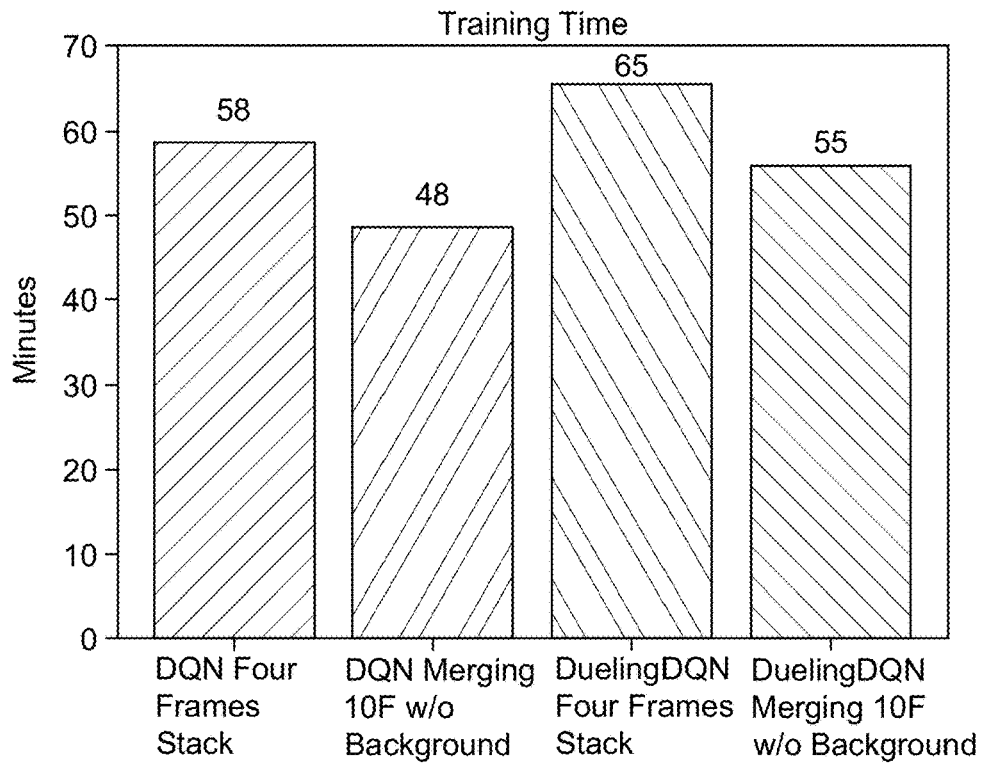
FIG. 23 is a chart of training time while training a dueling DQN with the merging technique.
Figure 24:
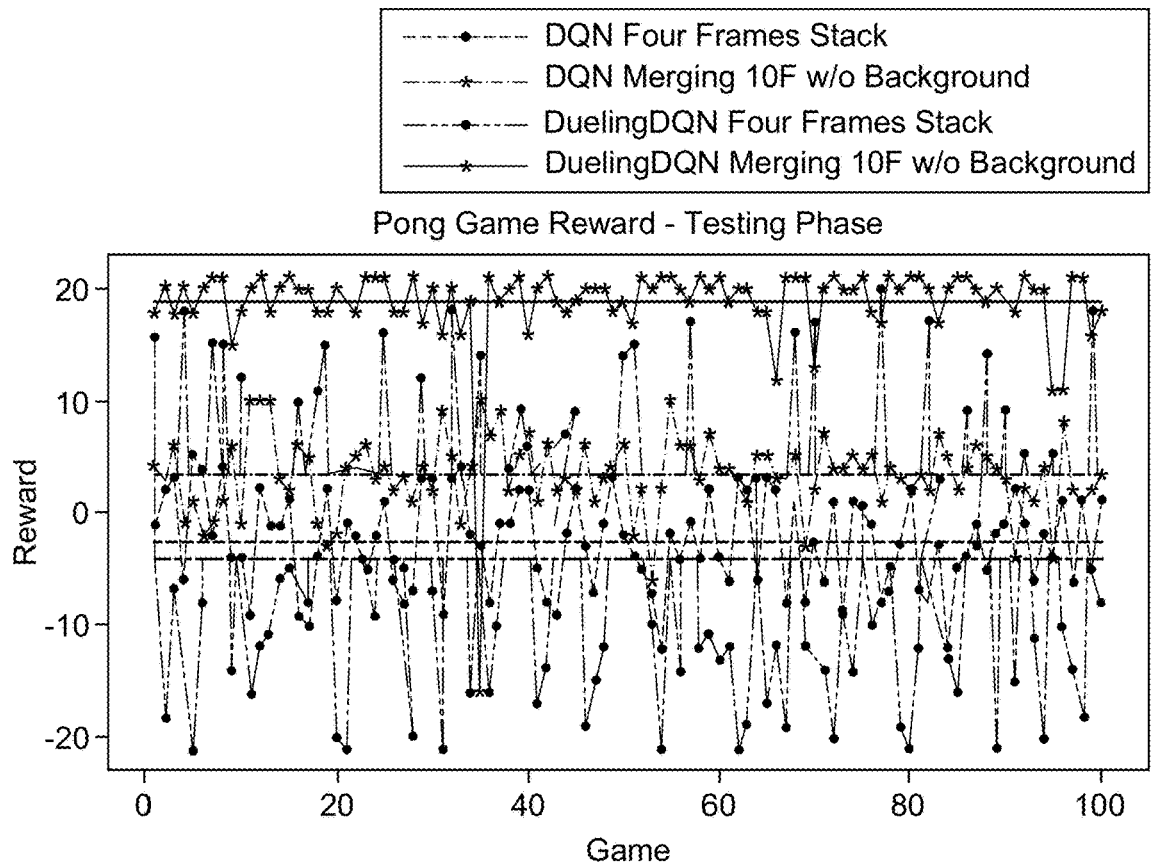
FIG. 24 is a graph of reward during the training phase in the Pong game.

To further test the merging technique, DQN was tested against Dueling DQN. The implementation of the bassline was used for both algorithms in addition to applying the merging technique with background removal. To increase the difficulty of the benchmark on the agents, the training phase was limited to 500 thousand frames and then each agent was tested in 100 games. FIG. 23 shows that the training time for Dueling DQN with merging technique was in fact less than the one required by DQN with the stack of frames even though the same algorithm when used with the stack of frames was the worst in terms of training time. In the testing phase, as shown in FIG. 24, Dueling DQN with the merging technique showed superior performance when compared to the rest of the algorithms. The second in performance was the DQN with the merging technique and this shows that the merging technique demonstrates dominance in performance over the stack version.

Baseline DQN (VizDoom Video Game)

Figure 25:
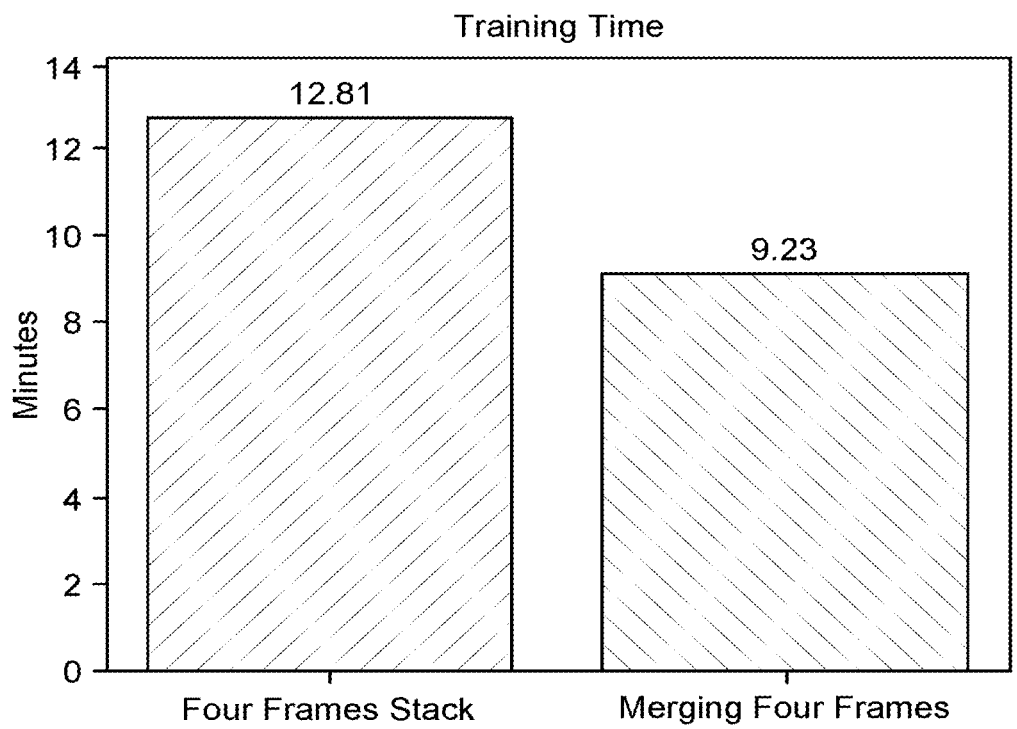
FIG. 25 is a chart of training time in VizDoom game.
Figure 26:
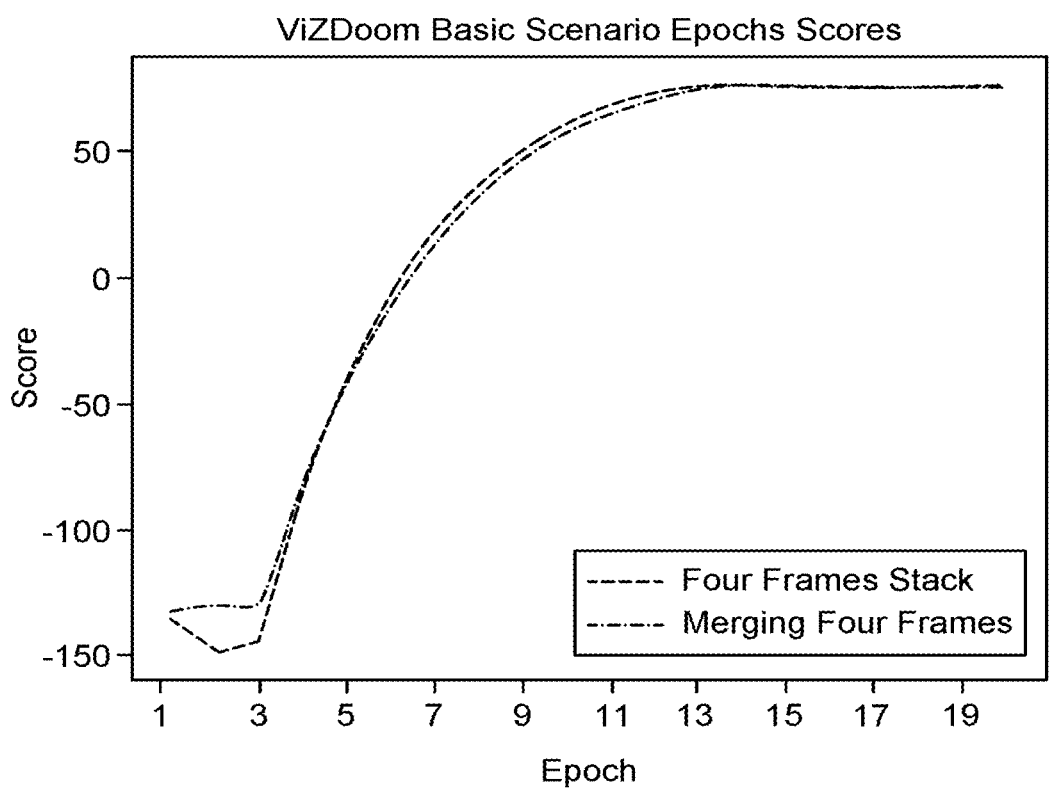
FIG. 26 is a graph of scores in VizDoom game using a center scenario.
Figure 27:
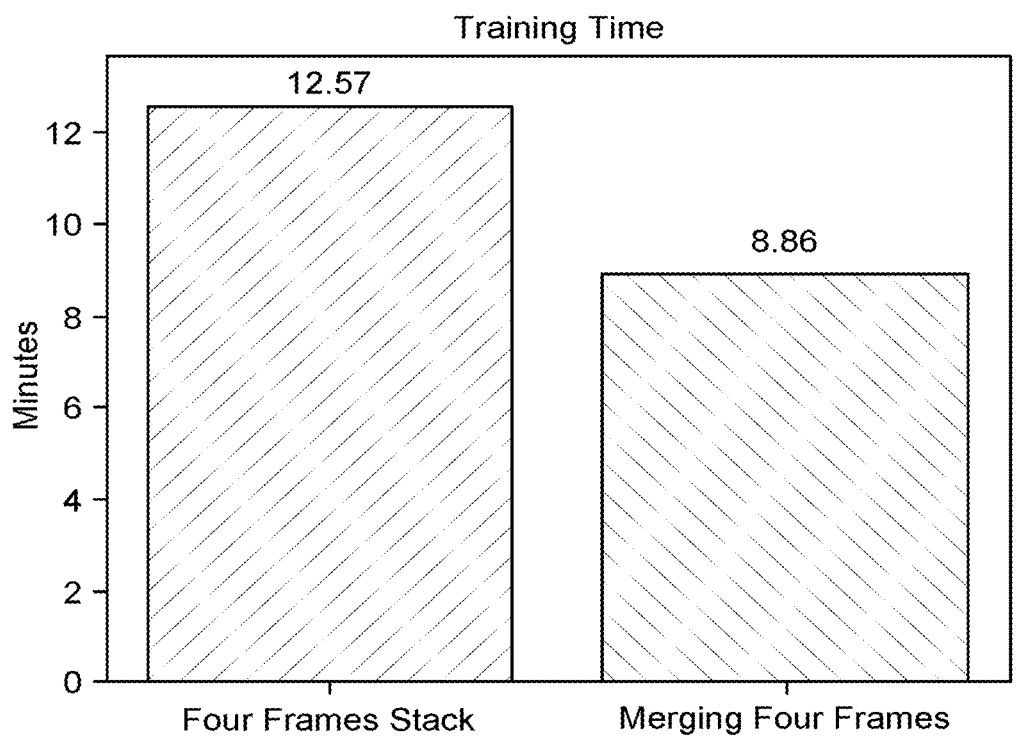
FIG. 27 is a chart of training time in VizDoom game using a center scenario.
Figure 28:
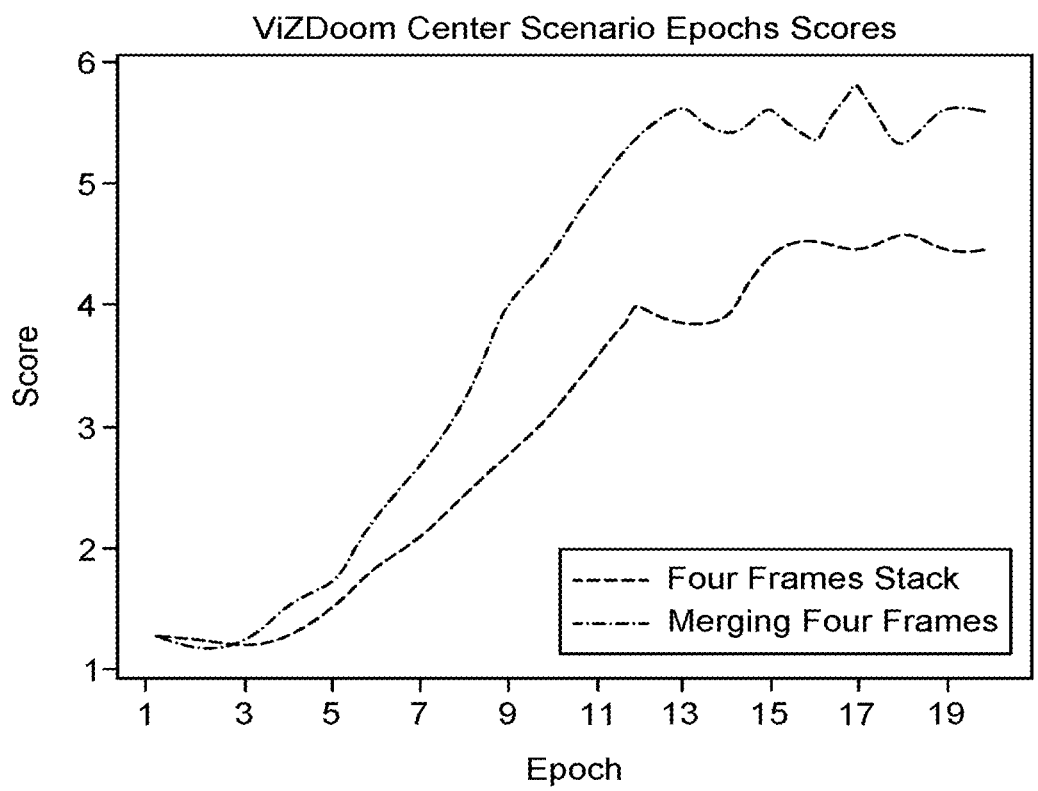
FIG. 28 is a graph of scores in VizDoom game center scenario.

In this experiment, a more complex video game was used to test the baseline algorithm when equipped with the merging technique. Two of the mini games in VizDoom were selected for this experiment: the basic scenario and the center scenario. In both scenarios, the training time required by the merging time was less than the stack version as shown in FIG. 25 and FIG. 27 respectively. In terms of performance, in the first scenario the performance was almost similar (FIG. 26). However, in the second scenario, the merging technique showed better results than the stack version as can be seen in FIG. 28.

Figure 29:
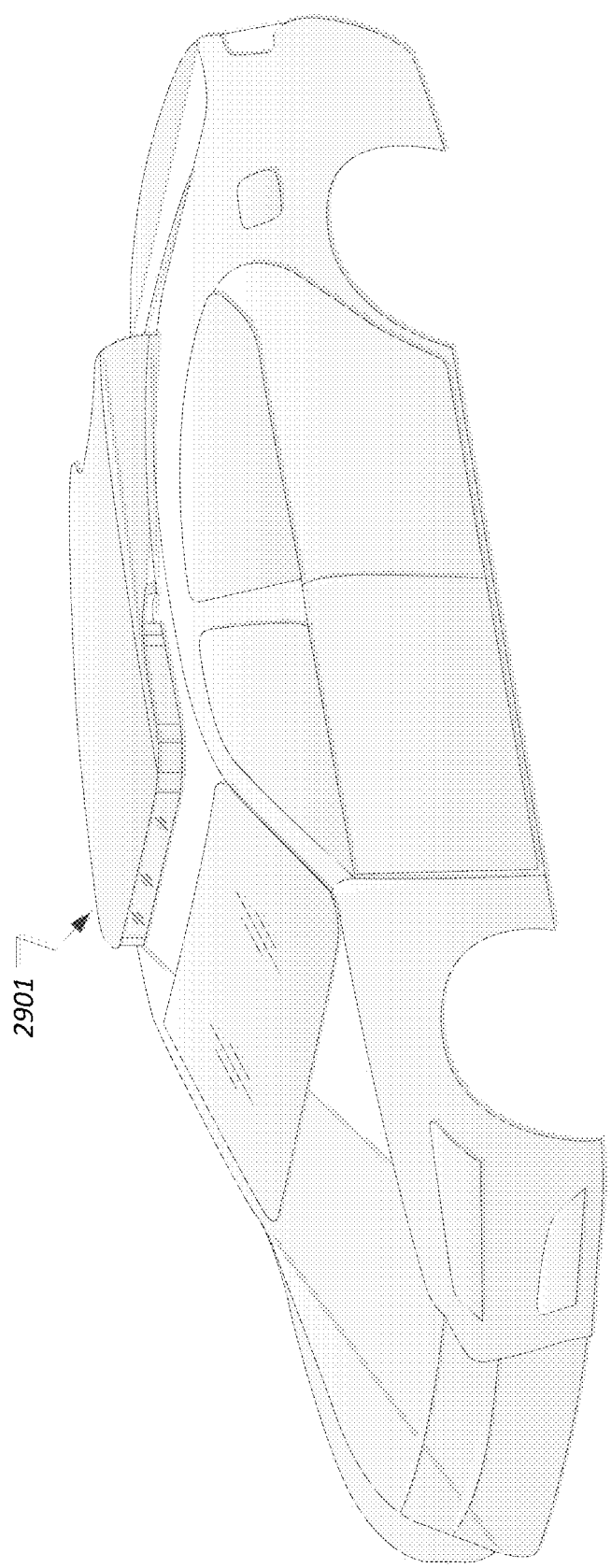
FIG. 29 illustrates a typical self-driving car.

Self-driving vehicles FIG. 29 illustrates a typical self-driving car equipped with a sensor array. Sensors in a car sensor array 2901 may include several cameras and radar devices. The cameras may be configured to capture video of a forward view of the car, rear view of the car, as well as side views. The videos captured by the various cameras may be used to provide information about the road, such as location of road markings, and may also be used to detect objects, either in the road or along a side of the road. As the car travels, stationary objects will change position in the camera view field. Moving objects will change position relative to the moving car, and will change position even when the car is stopped.

With regard to reinforcement learning, an embedded computer may be used to perform the reinforcement learning procedure, or a car may rely on a network connection to a remote computer or computer network. Embedded computers for self-driving cars include Nvidia Drive, as an example. States of the environment may include location of road markings as the car travels along the road and moving and/or stationary objects in the field of view of a camera. A vehicle sensor array may obtain video from several cameras and perform sensor fusion to combine camera video images. The reinforcement learning may assign rewards to various states. In some embodiments, the rewards may be determined according to a value function. A negative reward may be assigned to states that are off-road or states that include certain types of objects. A positive reward may be assigned to states in which the car is safely within the road as indicated by road markings. The value function may handle competing rewards, such as a positive reward for staying within road markings and a negative reward for coming too close to a forward vehicle.

According to the present disclosure, preprocessing 117 may be performed on stacks of frames constituting fused video images. A technique used for cases such as self-driving cars which must consider many states, is to incorporate experiences, a technique referred to as experience replay. In some embodiments, preprocessed stacks of video frames and corresponding actions selected by the selector 115 may be stored as experiences (stored state, action and reward). The Q-learning neural network 113 may be trained by randomly choosing from all stored experiences and creating an average update for the neural network weights which maximizes Q-values for all actions taken during those experiences.

The disclosed technique may include or consist of two parts: the merging technique and Background removal. The merging technique can simplify the architecture of the CNN by reducing a stack of frames to one frame.

The merging technique can solve the partial observability issue using one frame only, as the one frame includes information portraying temporal movement obtained in the stack of frames. The time required to train DQN equipped with the merging technique is less than the time required by the version of the stack of frames.

The performance of DQN equipped with the merging technique is nearly equal to the one with the stack of frames in one of the implementations while it surpasses it in other ones.

The number of frames used in the merging technique can be increased without a huge increase in the required training time which is opposite to the situation with the stack of frames.

By using background removal in addition to the merging technique, the performance of DQN becomes better than the one with the stack of frames in all implementations.

The increase in training time required when using background removal is very minimal and maintains the advantage of using the merging technique.

The disclosed technique has been tested on Double DQN and Dueling DQN and it showed an increased performance while reducing the training time required.

The disclosed technique is not limited to DQN. It can further improve any algorithm that is based on DQN.

The disclosed technique can be applied to any DRL algorithm that uses CNN as its core value function approximator.

The disclosed technique has been tested in simple games like Pong and more complex ones like VizDoom and it has shown an improvement in performance and reduction in training time required.

Numerous modifications and variations of the present invention are possible in light of the above teachings. It is therefore to be understood that within the scope of the appended claims, the invention may be practiced otherwise than as specifically described herein.

The invention claimed is:

1. A reinforcement learning method for learning actions based on states of an environment depicted in a video, the method performed by processing circuitry, including:
    obtaining and storing video frames of the video in a video memory;
    performing, by the processing circuitry, a first preprocessing step of
    retrieving a sequence of n image frames of the stored video frames, and
    merging the n image frames in a fading-in fashion by incrementally increasing the intensity of each frame up to the most recent frame having full intensity to obtain a merged frame; and
    performing, by the processing circuitry, a training step of inputting the merged frame to a Deep Q Neural Network (DQN) and training the DQN to learn Q-values for all actions from a state of the environment represented by the merged frame with only a single forward pass through the network;
    and
    selecting an action based on the Q-values.

2. The learning method of claim 1, further comprising:
    performing, by the circuitry, a second preprocessing step of
    removing background image data from the merged frame before inputting the merged frame to the DQN.

3. The learning method of claim 1, wherein the DQN is a double DQN that learns two action-value functions in a mutually symmetric fashion.

4. The learning method of claim 1, wherein the DQN includes a convolution neural network that outputs to two separated fully connected layers, one for a state value function and another for a state-dependent action function.

5. The learning method of claim 1, wherein then image frames is a stack of 10 image frames.

6. The learning method of claim 1, wherein the training comprises:
    storing the merged image along with an associated action and a reward value that is based on the action in an experience memory;
    retrieving the stored experience and provide an end state to the DQN;
    operating the DQN to determine Q values for actions and selecting a next action based on a maximum Q-value;
    determining a reward based on the selected next action.

7. The learning method of claim 1, wherein the processing circuitry incrementally increases the intensity of each frame by multiplying each pixel value by a predetermined percentage.

8. The learning method of claim 7, wherein the processing circuitry reduces the pixel values of the oldest frame to a predetermined minimum value.

9. The learning method of claim 1, wherein the merging then image frames, by the processing circuitry, includes increasing the contrast of each frame before incrementally increasing the intensity of each frame.

10. The learning method of claim 1, wherein the merging the n image frames, by the processing circuitry, includes normalizing the intensity values in each frame.

11. A reinforcement learning apparatus for learning actions based on states of an environment depicted in a video, the method, comprising:
    a video memory configured to store video frames of the video;
    preprocessing circuitry configured to retrieve a sequence of n image frames of the stored video frames, and merge the n image frames in a fading-in fashion by incrementally increasing the intensity of each frame up to the most recent frame having full intensity to obtain a merged frame;
    a Deep Q Neural Network (DQN) configured to receive the merged frame, perform a training process to learn Q-values for all possible actions from a state of the environment represented by the merged frame with only a single forward pass through the network, and selecting an action based on the Q-values.

12. The apparatus of claim 11, wherein the preprocessing circuitry is further configured to
    perform a second preprocessing step of
    removing background image data from the merged frame before inputting the merged frame to the DQN.

13. The apparatus of claim 11, wherein the DQN is a double DQN that performs a training process to learn two action-value functions in a mutually symmetric fashion.

14. The apparatus of claim 11, wherein the DQN includes a convolution neural network that outputs to two separated fully connected layers, one for a state value function and another for a state-dependent action function.

15. The apparatus of claim 11, wherein the preprocessing circuitry is configured to retrieve a sequence of 10 image frames of the stored video frames.

16. The apparatus of claim 11, wherein the DQN is configured to perform the training process including
storing the merged image along with an associated action and a reward value that is based on the action in an experience memory;
retrieving the stored experience and provide an end state to the DQN;
operating the DQN to determine Q values for actions and selecting a next action based on a maximum Q-value;
determining a reward based on the selected next action.

17. The apparatus of claim 11, wherein the preprocessing circuitry incrementally increases the intensity of each frame by multiplying each pixel value by a predetermined percentage.

18. The apparatus of claim 17, wherein the preprocessing circuitry reduces the pixel values of the oldest frame to a predetermined minimum value.

19. The apparatus of claim 11, wherein the preprocessing circuitry merges the n image frames including increasing the contrast of each frame before incrementally increasing the intensity of each frame.

20. The apparatus of claim 11, wherein the preprocessing circuitry merges the n image frames including normalizing the intensity values in each frame.

* * * * *